US012603687B2

(12) United States Patent
Saggar et al.

(10) Patent No.: US 12,603,687 B2
(45) Date of Patent: Apr. 14, 2026

(54) FULL-DUPLEX BEAM SELECTION FOR SIDELINK COMMUNICATIONS

(71) Applicant: QUALCOMM Incorporated, San Diego, CA (US)

(72) Inventors: Hemant Saggar, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 18/162,611

(22) Filed: Jan. 31, 2023

(65) Prior Publication Data

US 2024/0259074 A1     Aug. 1, 2024

(51) Int. Cl.
| | |
|---|---|
| *H04B 7/06* | (2006.01) |
| *H04L 5/14* | (2006.01) |
| *H04W 24/10* | (2009.01) |

(52) U.S. Cl.
CPC ............. *H04B 7/0695* (2013.01); *H04L 5/14* (2013.01); *H04W 24/10* (2013.01)

(58) Field of Classification Search
CPC ......... H04B 7/0695; H04L 5/14; H04W 24/10
See application file for complete search history.

(56) References Cited

U.S. PATENT DOCUMENTS

| | | |
|---|---|---|
| 2020/0343944 A1 | 10/2020 | Kim et al. |
| 2020/0396599 A1 | 12/2020 | Luo et al. |

| | | | |
|---|---|---|---|
| 2021/0112429 A1 | 4/2021 | Raghavan et al. | |
| 2021/0367651 A1 | 11/2021 | Zhang et al. | |
| 2021/0368369 A1 | 11/2021 | Zhang et al. | |
| 2021/0376905 A1* | 12/2021 | Zhou ..................... | H04B 7/0696 |
| 2022/0030441 A1* | 1/2022 | Balasubramanian ..... | H04L 5/14 |
| 2022/0174690 A1* | 6/2022 | Wang .................... | H04W 72/20 |
| 2022/0345901 A1* | 10/2022 | Wang .................. | H04W 72/046 |
| 2024/0291630 A1* | 8/2024 | Zhou ..................... | H04W 72/23 |

FOREIGN PATENT DOCUMENTS

| | | | | |
|---|---|---|---|---|
| WO | WO-2017111821 A1 * | 6/2017 | .......... | H04L 67/303 |
| WO | 2022160080 A1 | 8/2022 | | |

OTHER PUBLICATIONS

International Search Report and Written Opinion—PCT/US2024/012918—ISA/EPO—Aug. 29, 2024.
Partial International Search Report—PCT/US2024/012918—ISA/EPO—May 7, 2024.

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a first user equipment (UE) may transmit, using a sidelink with a second UE, a first indication of one or more candidate full-duplex (FD) beam pairs selected by the first UE for an FD sidelink transmission. The UE may receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The UE may communicate with the second UE using the sidelink based at least in part on the FD beam set and the FD sidelink transmission. Numerous other aspects are described.

30 Claims, 12 Drawing Sheets

400

Access Link (AL)

Access Link (AL)

110

Sidelink (SL)

Rx/Tx UE
410

Tx/Rx UE
405

KEY:

Transmission ——————

Frequency Band --------

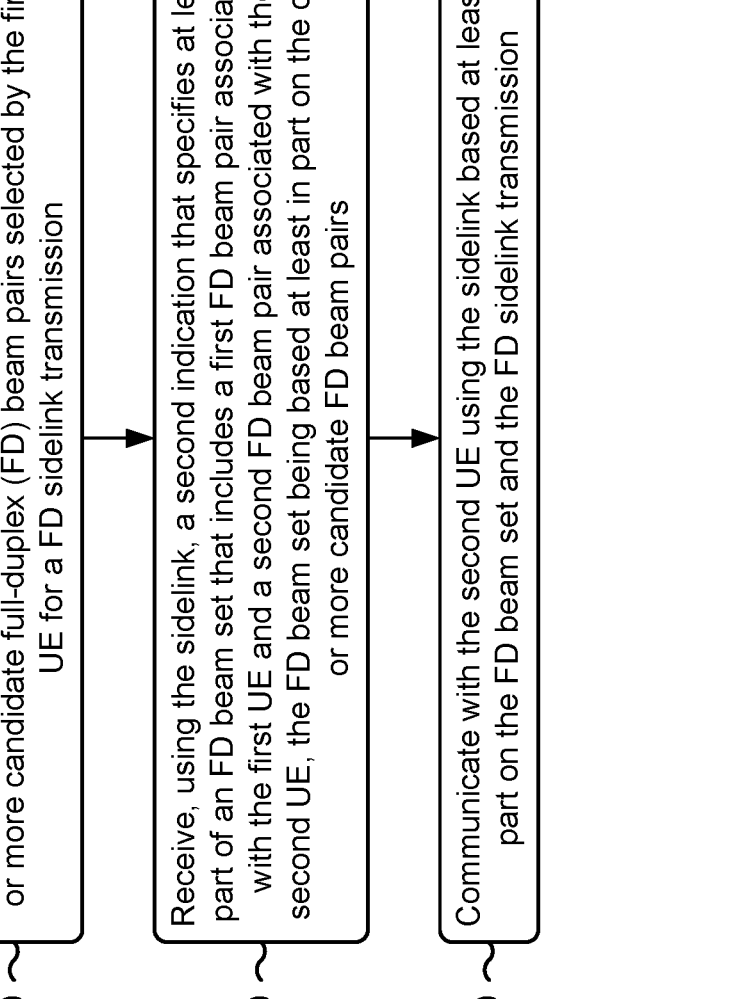

Transmit, using a sidelink with a second UE, a first indication of one or more candidate full-duplex (FD) beam pairs selected by the first UE for a FD sidelink transmission Receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs Communicate with the second UE using the sidelink based at least in part on the FD beam set and the FD sidelink transmission

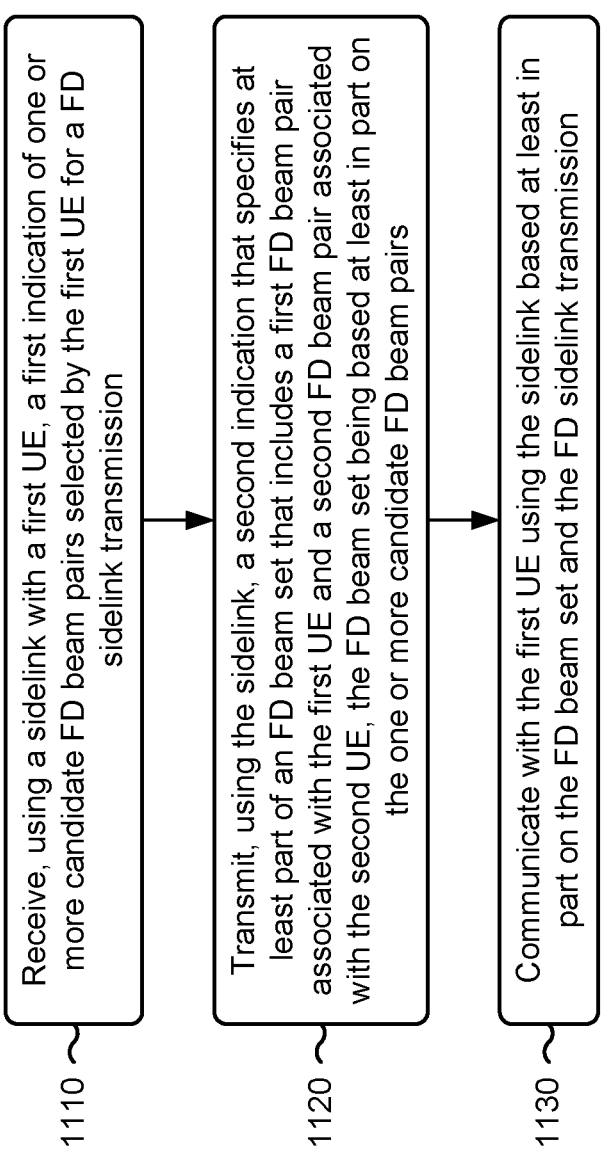

1110 — Receive, using a sidelink with a first UE, a first indication of one or more candidate FD beam pairs selected by the first UE for a FD sidelink transmission 1120 — Transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs 1130 — Communicate with the first UE using the sidelink based at least in part on the FD beam set and the FD sidelink transmission

Reception Component 1202

Communication Manager 1206

Transmission Component 1204

1208

FULL-DUPLEX BEAM SELECTION FOR SIDELINK COMMUNICATIONS

FIELD OF THE DISCLOSURE

Aspects of the present disclosure generally relate to wireless communication and to techniques and apparatuses for full-duplex beam selection for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, using a sidelink with a second UE, a first indication of one or more candidate full-duplex (FD) beam pairs selected by the first UE for an FD sidelink transmission. The method may include receiving, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The method may include communicating with the second UE using the sidelink based at least in part on the FD beam set and the FD sidelink transmission.

Some aspects described herein relate to a method of wireless communication performed by a second UE. The method may include receiving, using a sidelink with a first UE, a first indication of one or more candidate FD beam pairs selected by the first UE for an FD sidelink transmission. The method may include transmitting, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The method may include communicating with the first UE using the sidelink based at least in part on the FD beam set and the FD sidelink transmission.

Some aspects described herein relate to an apparatus for wireless communication at a first UE. The apparatus may include a memory and one or more processors coupled to the memory. The one or more processors may be configured to cause the apparatus to transmit, using a sidelink with a second UE, a first indication of one or more candidate FD beam pairs selected by the first UE for an FD sidelink transmission. The one or more processors may be configured to cause the apparatus to receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The one or more processors may be configured to cause the apparatus to communicate with the second UE using the sidelink based at least in part on the FD beam set and the FD sidelink transmission.

Some aspects described herein relate to an apparatus for wireless communication at a second UE. The apparatus may include a memory and one or more processors coupled to the memory. The one or more processors may be configured to cause the apparatus to receive, using a sidelink with a first UE, a first indication of one or more candidate FD beam pairs selected by the first UE for an FD sidelink transmission. The one or more processors may be configured to cause the apparatus to transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The one or more processors may be configured to cause the apparatus to communicate with the second UE using the sidelink based at least in part on the FD beam set and the FD sidelink transmission.

Some aspects described herein relate to a non-transitory computer-readable medium that stores a set of instructions for wireless communication by a first UE. The set of instructions, when executed by one or more processors of the first UE, may cause the first UE to transmit, using a sidelink with a second UE, a first indication of one or more candidate FD beam pairs selected by the first UE for an FD sidelink transmission. The set of instructions, when executed by one or more processors of the first UE, may cause the first UE to receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The set of instructions, when executed by one or more processors of the first UE, may cause the first UE to communicate with the second UE using the sidelink based at least in part on the FD beam set and the FD sidelink transmission.

Some aspects described herein relate to a non-transitory computer-readable medium that stores a set of instructions for wireless communication by a second UE. The set of instructions, when executed by one or more processors of the second UE, may cause the second UE to receive, using a sidelink with a first UE, a first indication of one or more candidate FD beam pairs selected by the first UE for an FD sidelink transmission. The set of instructions, when executed by one or more processors of the second UE, may cause the second UE to transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The set of instructions, when executed by one or more processors of the second UE, may cause the second UE to communicate with the first UE using the sidelink based at least in part on the FD beam set and the FD sidelink transmission.

Some aspects described herein relate to a first apparatus for wireless communication. The apparatus may include means for transmitting, using a sidelink with a second apparatus, a first indication of one or more candidate FD beam pairs selected by the first UE for an FD sidelink transmission. The first apparatus may include means for receiving, using the sidelink, a second indication that specifies at least part of an FD beam set that includes a first FD beam pair associated with the first apparatus and a second FD beam pair associated with the second apparatus, the FD beam set being based at least in part on the one or more candidate FD beam pairs. The apparatus may include means for communicating with the second apparatus using the sidelink based at least in part on the FD beam set and the FD sidelink transmission.

Some aspects described herein relate to a second apparatus for wireless communication. The second apparatus may include means for receiving, using a sidelink with a first apparatus, a first indication of one or more candidate FD beam pairs selected by the first apparatus for an FD sidelink transmission. The second apparatus may include means for transmitting, using the sidelink, a second indication that specifies at least part of an FD beam set that includes a first FD beam pair associated with the first apparatus and a second FD beam pair associated with the second apparatus, the FD beam set being based at least in part on the one or more candidate FD beam pairs. The apparatus may include means for communicating with the first apparatus using the sidelink based at least in part on the FD beam set and the FD sidelink transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a UE, in accordance with the present disclosure.

FIG. 11 is a diagram illustrating an example process performed, for example, by a UE, in accordance with the present disclosure.

DETAILED DESCRIPTION

Figure 1:
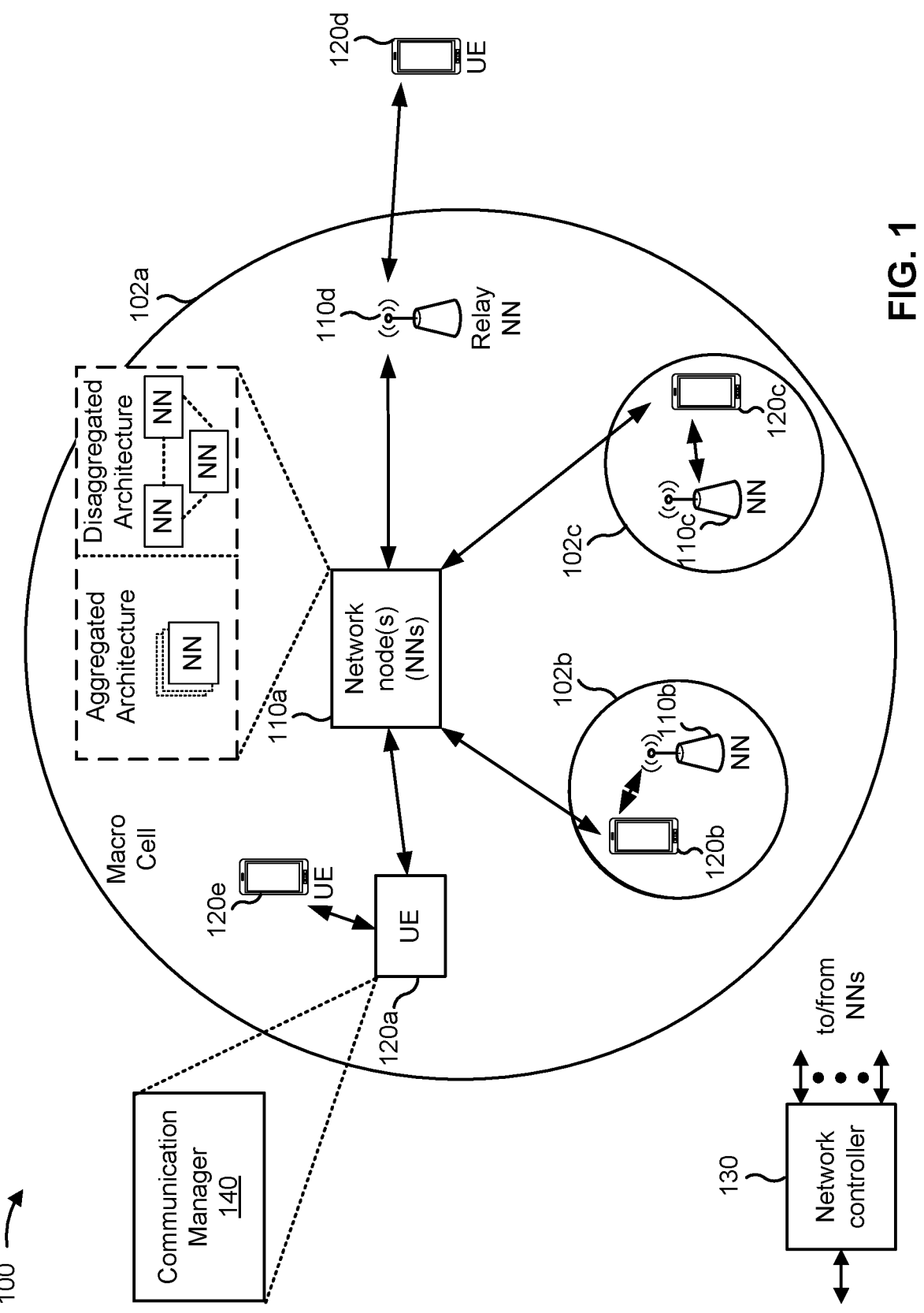
FIG. 1 is a diagram illustrating an example of a wireless network, in accordance with the present disclosure.

Using one or more half-duplex (HD) beam pairs for full-duplex (FD) sidelink communication may result in decreased performance of a sidelink relative to using the HD beam pair for HD sidelink communication. Such decreased performance may include increased recovery errors, increased data transfer latencies, and/or decreased data throughput. To illustrate, the HD beam selection process may select an HD receive beam based at least in part on improving a link quality between a first device and a second device based at least in part on HD communications that occur serially (e.g., at different times), and disregard an amount of self-interference observed at a UE when the HD receive beam is paired with an HD transmit beam during bi-directional communications at a same time. Accordingly, using HD beam pairs and/or HD beam selection for FD sidelink communications may be sub-optimal and result in decreased performance by the sidelink and/or link failure.

Some techniques and apparatuses described herein provide FD beam selection for sidelink communications. A first UE may transmit, to a second UE, one or more candidate FD beam pairs associated with FD sidelink communications. The first UE may receive, from the second UE, an indication of an FD beam set to use for FD sidelink communications. The FD beam set may specify one or more FD beam pairs that are optimized for FD communications, such as an FD beam pair that is optimized to reduce self-interference at the first UE. The first UE may use at least part of the FD beam set to transmit an FD sidelink communication to the second UE and/or receive an FD sidelink communication from the second UE.

By indicating candidate FD beam pairs, the first UE may indicate FD beam pairs that reduce self-interference at the first UE and improve FD sidelink performance. To illustrate, the improved FD sidelink performance may reduce recovery errors, reduce sidelink data transfer latencies, and/or improve sidelink bandwidth.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. In some aspects, FR2 may include multiple frequency ranges. To illustrate, FR2-1 may refer to a first frequency range that includes 24.25 GHz-52.6 GHz, and FR2-2 may refer to a second frequency range (e.g., an extended FR2) that includes 52.6 GHz--71 GHz.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit, using a sidelink with another UE, a first indication of one or more candidate FD beam pairs selected by the UE for an FD sidelink transmission; receive, using the sidelink, a second indication that specifies at least part of an FD beam set that includes a first FD beam pair associated with the UE and a second FD beam pair associated with the other UE, the FD beam set being based at least in part on the one or more candidate FD beam pairs; and communicate with the other UE using the sidelink based at least in part on the FD beam set and the FD sidelink transmission.

Alternatively or additionally, in some aspects, the communication manager 140 may receive, using a sidelink with the other UE, a first indication of one or more candidate FD beam pairs selected by the other UE for an FD sidelink transmission; transmit, using the sidelink, a second indication that specifies at least part of an FD beam set that includes a first FD beam pair associated with the other UE and a second FD beam pair associated with the UE, the FD beam set being based at least in part on the one or more candidate FD beam pairs; and communicate with the other UE using the sidelink based at least in part on the FD beam set and the FD sidelink transmission. Additionally, or alternatively, the communication manager 140 may perform one or more other operations described herein.

As indicated above, FIG. 1 is provided as an example. Other examples may differ from what is described with regard to FIG. 1.

Figure 2:
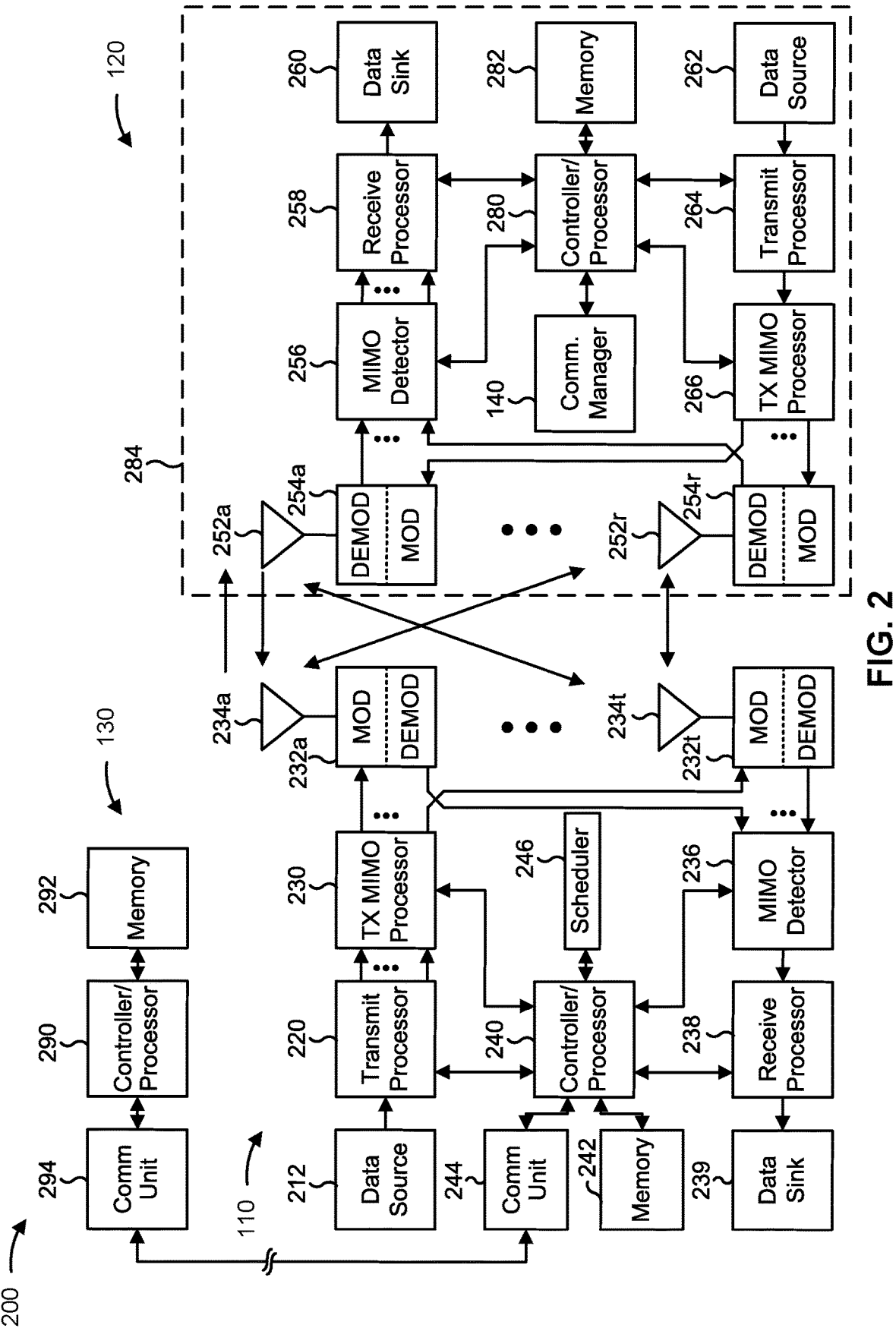
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with FD beam selection for sidelink communications, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, using a sidelink with another UE, a first indication of one or more candidate FD beam pairs selected by the UE for an FD sidelink transmission; means for receiving, using the sidelink, a second indication that specifies at least part of an FD beam set that includes a first FD beam pair associated with the UE and a second FD beam pair associated with the other UE, the FD beam set being based at least in part on the one or more candidate FD beam pairs; and/or means for communicating with the other UE using the sidelink based at least in part on the FD beam set and the FD sidelink transmission.

Alternatively, or additionally, a UE (e.g., the UE 120) includes means for receiving, using a sidelink with another UE, a first indication of one or more candidate FD beam pairs selected by the other UE for an FD sidelink transmission; means for transmitting, using the sidelink, a second indication that specifies at least part of an FD beam set that includes a first FD beam pair associated with the UE and a second FD beam pair associated with the other UE, the FD beam set being based at least in part on the one or more candidate FD beam pairs; and/or means for communicating with the other UE using the sidelink based at least in part on the FD beam set and the FD sidelink transmission. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
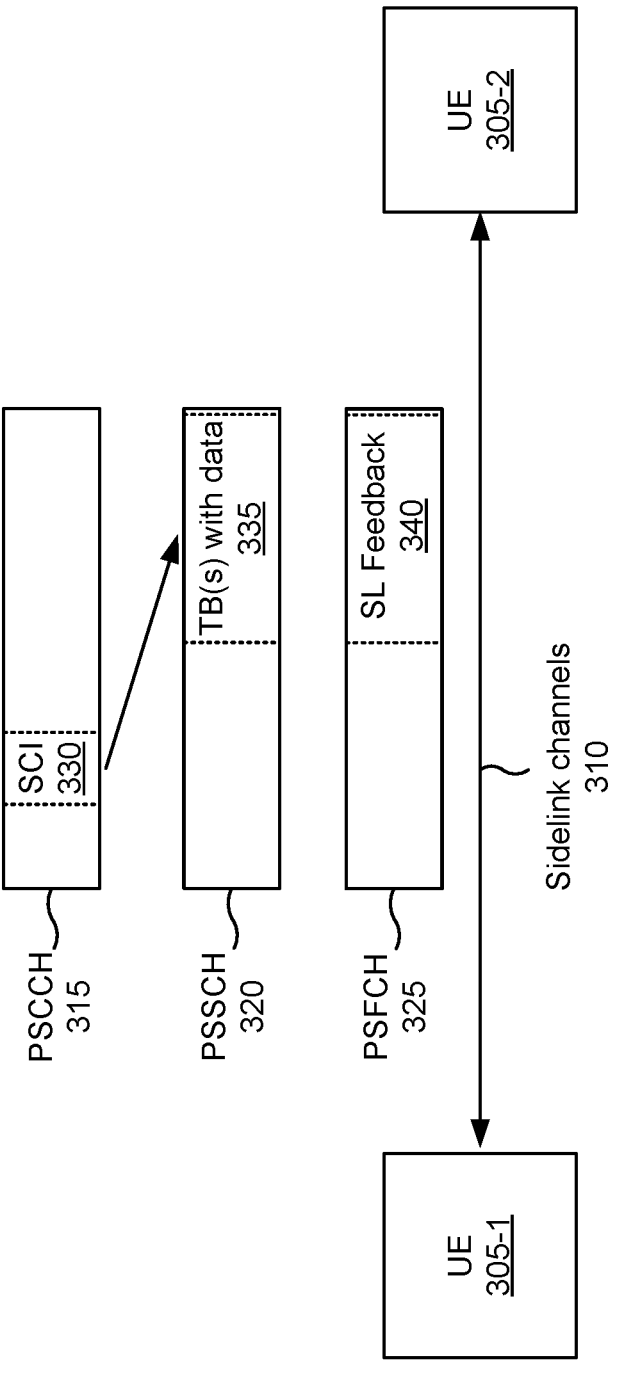
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
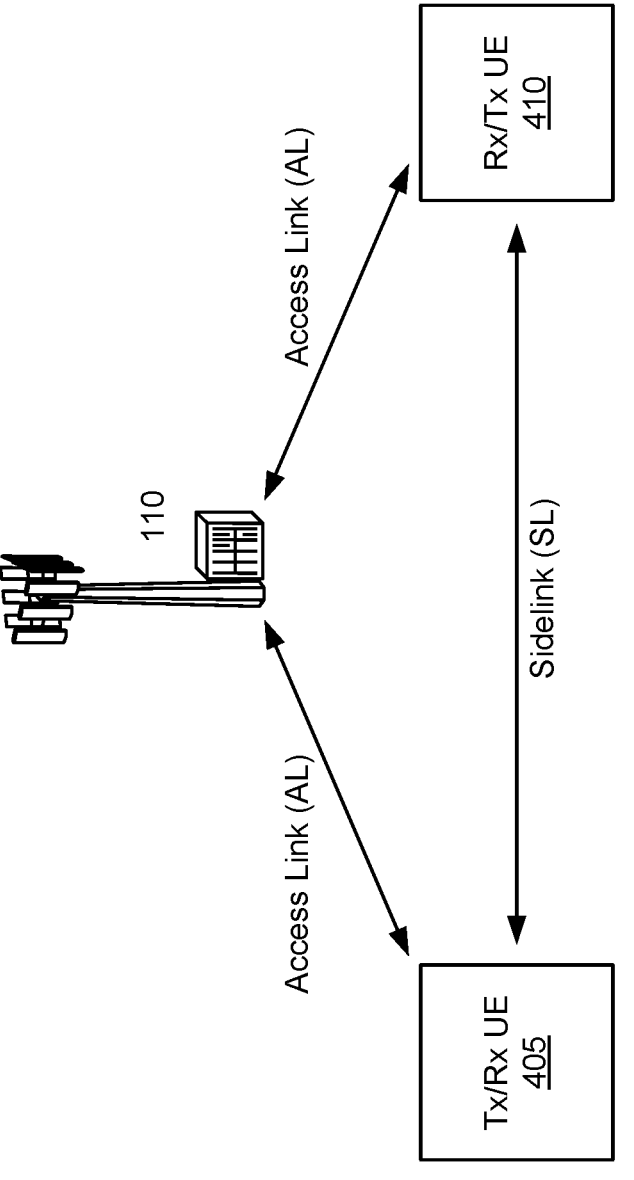
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

FIGS. 5A, 5B, 5C, and 5D are diagrams illustrating examples 500, 502, 504, and 506 of HD communications or FD communications, in accordance with the present disclosure. "Half-duplex communication" in a wireless network refers to unidirectional communications (e.g., only downlink communication, only uplink communication, and/or a unidirectional sidelink communication) between devices at a given time (e.g., in a given slot or a given symbol). "Full-duplex communication" in a wireless network refers to simultaneous bi-directional communication between devices in the wireless network. For example, a UE and/or a network node operating in a full-duplex mode may transmit an uplink communication and receive a downlink communication at the same time (e.g., in the same slot or the same symbol). To illustrate, the UE and/or the network node may transmit and receive full-duplex communications based at least in part on including multiple antenna panels and/or an ability to configure a single antenna panel into multiple antenna groups such that a first antenna panel and/or first antenna group is configured to transmit a first FD communication and a second antenna panel and/or second antenna group is configured to receive a second FD communication. The UE and/or the network node may alternatively or additionally have isolation hardware to isolate transmitter chain hardware from receiver chain hardware.

"In-band full-duplex (IBFD) communication" may denote a first device (e.g., a UE and/or a network node) transmitting a first communication to a second device (e.g., a UE and/or network node) receiving a second communication from the second device based at least in part on the same time and/or frequency resources. As one example, a UE operating in an IBFD mode may transmit an uplink signal to a network node and receive a downlink signal from the network node (e.g., also operating in a full-duplex mode) in a same time and frequency resource. As another example, a first UE operating in an IBFD mode may transmit a first sidelink signal to a second UE (e.g., also operating in the full-duplex mode), and receive a second sidelink signal from the second UE in the same time and frequency resource. IBFD communication may include fully-overlapping time and frequency resources and/or partially-overlapping time and frequency resources. That is, the full-duplex communications by the two devices may use the same time and frequency resource(s) in a fully-overlapping full-duplex mode (e.g., a fully-overlapping IBFD mode), and the full-duplex communications by the two devices may use only some of the same time and frequency resources in a partially-overlapping full-duplex mode (e.g., a partially-overlapping IBFD mode). IBFD may also be referred to as "full band full duplex (FBFD" and/or "single frequency full duplex (SFFD)."

"Sub-band full-duplex (SBFD) communication", which may also be referred to as "sub-band frequency division duplex (SBFDD)" or "flexible duplex," may denote a first device (e.g., a UE and/or a network node) transmitting a first communication to a second device (e.g., a UE and/or a network node) and receiving a second communication from the second device at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

Figures 5A, 5B, 5C, 5D:
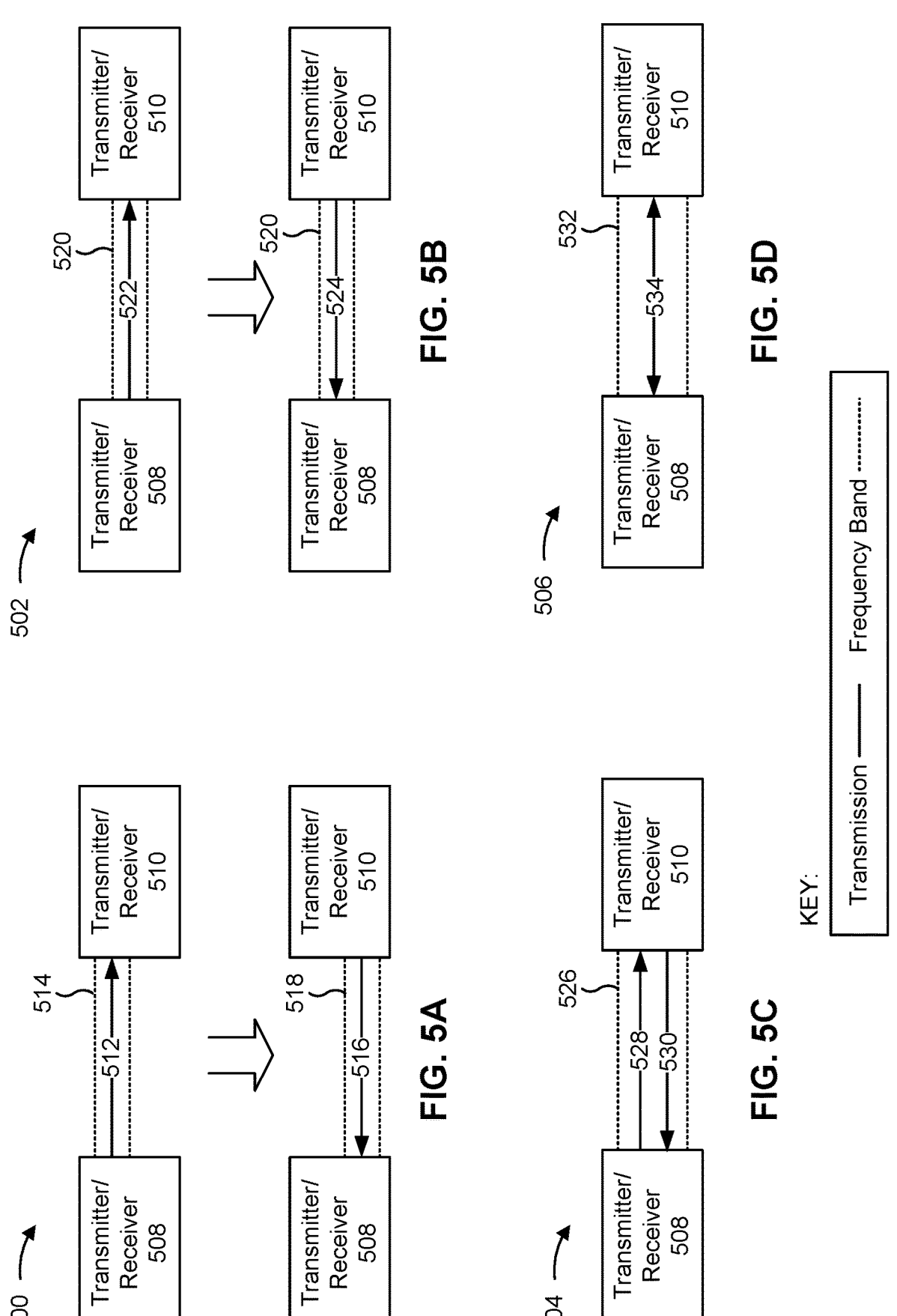
FIGS. 5A, 5B, 5C, and 5D are diagrams illustrating examples of half-duplex (HD) communications or full-duplex (FD) communications, in accordance with the present disclosure.

The example 500 shown by FIG. 5A illustrates a first example of HD communications between a first device 508 and a second device 510 that each include a respective transmitter and receiver (transmitter/receiver). To illustrate, the first device 508 and the second device 510 may be a network node 110 and a UE 120, a UE 120 and a network node 110, a first network node 110 and a second network node 110, and/or a first UE 120 and a second UE 120. In the example 500, the first device 508 and the second device 510 communicate in a serial manner based at least in part on using different time resources and different frequency bands. As shown by the upper portion of FIG. 5A, the first device 508 may transmit a first transmission 512 to the second device 510 based at least in part on a first frequency band 514. In some aspects, the second device 510 may transmit a second transmission 516 to the first device 508 based at least in part on a second frequency band 518. The second device 510 may transmit the second transmission 516 based at least in part on receiving the first transmission 512 or autonomously and/or independent from receiving the first transmission 512. However, and based at least in part on the first device 508 and the second device 510 using HD communications in the example 500, the first transmission 512 and the second transmission 516 occur in different time resources such that the two transmissions do not overlap in the time domain.

The example 502 shown by FIG. 5B illustrates a second example of HD communications between the first device 508 and the second device 510 based at least in part on different time resources and a frequency band 520. As one example, the first device 508 and the second device 510 may share the frequency band 520 and/or portions of the frequency band 520 based at least in part on time division duplexing (TDD). Accordingly, and as shown by the upper portion of FIG. 5B, the first device 508 may transmit, at a first point in time, a first transmission 522 to the second device 510 based at least in part on the frequency band 520. Alternatively, or additionally, the second device 510 may transmit, at a second point in time, a second transmission 524 to the first device 508 based at least in part on the frequency band 520 (e.g., either autonomously and/or based at least in part on receiving the first transmission 522). Based at least in part on the first device 508 and the second device 510 using HD communications in the example 502, the first transmission 522 and the second transmission 524 occur in different time resources such that the two transmissions do not overlap in the time domain The example 504 shown by FIG. 5C illustrates a first example of FD communications between the first device 508 and the second device 510 based at least in part on sharing a frequency band 526. For example, the first device 508 may transmit, to the second device 510, a first transmission 528 based at least in part on a first sub-band of the frequency band 526 and a time resource. The second device 510 may transmit, to the first device 508, a second transmission 530 based at least in part on the time resource and a second sub-band of the frequency band 526. That is, the first device 508 and the second device 510 may communicate with one another based at least in part on SBFD. Accordingly, the first transmission 528 and the second transmission 530 occur in a same time resource such that the two transmissions may partially and/or fully overlap in the time domain. However, based at least in part on the sub-band partitioning of the frequency band 526, the first transmission 528 and the second transmission 530 do not overlap in the frequency domain.

The example 506 shown by FIG. 5D illustrates a second example of FD communications between the first device 508 and the second device 510 based at least in part on sharing a frequency band 532. In the example 506, the first device 508 and the second device 510 may communicate with one another based at least in part on IBFD. For example, and as shown by reference number 534, the first device 508 may use a frequency resource and time resource to transmit a first communication to the second device, and the second device 510 may use the (same) frequency resource (and/or a same portion of a frequency resource) and time resource (and/or a same portion of a time resource) to transmit a second communication to the first device 508. Accordingly, the first communication and the second communication shown by reference number 534 occur in a same time resource and a same frequency resource such that the two transmissions may partially and/or fully overlap in the time domain, and partially and/or fully overlap in the frequency domain.

An ongoing sidelink communication between two UEs that are each operating in an HD mode may include bi-directional traffic that occurs in a serial manner, such as that described with regard to the example 500 and/or the example 502. In some aspects, the two UEs may establish the sidelink based at least in part on a combination of beams. As one example, a first UE may select a first HD transmit beam for transmitting a communication using the sidelink, and a second UE may select a first HD receive beam for receiving the communication using the sidelink. Alternatively, or additionally, the second UE may select a second HD transmit beam for transmitting a communication using the sidelink, and the first UE may select a second HD receive beam for receiving the communication using the sidelink. Accordingly, a "half-duplex beam pair" (e.g., an HD beam pair) may denote a transmit beam used by a first device and a receive beam used by a second device to transmit and receive an HD communication, respectively.

For each HD sidelink connection and/or HD beam pair, the transmit beam and the receive beam may be selected based at least in part on improving a performance of the sidelink (e.g., reduce recovery errors, reduce data transfer latencies, and/or increase bandwidth), such as by selecting an HD beam pair that results in a higher signal-to-noise ratio (SNR) relative to other transmit beam and receive beam pairs. For instance, for a first HD sidelink transmission direction, the first UE may select a transmit beam, and the second UE may perform a receive-side beam sweeping procedure in which the second UE alternates between receive beams, generates a respective signal metric based at least in part on a beam combination, and selects a receive beam with a desired signal metric (e.g., higher SNR relative to other beam pairs). Alternatively, or additionally, for a second HD sidelink transmission direction, the second UE may select a second transmit beam and the first UE may select a second receive beam based at least in part on performing a receive-side beam sweeping procedure at the first UE. Other examples may include the first UE alternating between transmit beams during a transmit-side beam sweeping procedure, and the second UE using a single receive beam (and transmitting signal metrics back to the first UE), and/or the second UE performing a receive-side beam sweeping procedure for each transmit beam used by the first UE in the transmit-side beam sweeping procedure (and/or vice versa). Accordingly, the selection of an HD beam pair may be based at least in part on optimizing a performance of an HD connection.

Using one or more HD beam pairs for FD sidelink communication may result in decreased performance of the sidelink relative to using the HD beam pair for HD sidelink communication. Such decreased performance may include increased recovery errors, decreased throughput, increased data transfer latencies, and/or decreased bandwidth. To illustrate, for transmission by the first UE, the first UE may use a first HD transmit beam of a first HD beam pair, and, for reception, the first UE may use a second HD receive beam of a second HD beam pair. However, the first HD transmit beam of the first HD beam pair and the second HD receive beam of the second HD beam pair may result in self-interference at the first UE when used for FD sidelink communications. For example, the HD beam selection process may select an HD receive beam based at least in part on improving a link quality (e.g., SNR) between a first device and a second device based at least in part on HD communications that occur serially (e.g., at different times) and disregard an amount of self-interference observed at a UE when the HD receive beam is paired with an HD transmit beam during bi-directional communications at a same time. Accordingly, using HD beam pairs and/or HD beam selection for FD sidelink communications may be sub-optimal and result in decreased performance by the sidelink and/or link failure.

Some techniques and apparatuses described herein provide FD beam selection for sidelink communications (e.g., Mode 2 sidelink communications). In some aspects, a first UE may transmit, using a sidelink with a second UE, a first indication of one or more candidate FD beam pairs selected by the first UE for an FD sidelink transmission. "Full-duplex beam pair" (FD beam pair) may denote an FD transmit beam and an FD receive beam used by a device for FD sidelink communications. That is, an FD beam pair may be used at a device to transmit a first communication and receive a second communication based at least in part on the device operating in an FD mode. Accordingly, the first UE may indicate candidate FD beam pair(s) that are candidate selections for FD sidelink communication by the first UE. The first UE may receive, using the sidelink, a second indication that specifies at least part of an FD beam set. "FD beam set" may denote a set of FD beam pairs used by two devices for FD sidelink communications. For example, an FD beam set may include a first FD beam pair associated with the first UE and a second FD beam pair associated with the second UE. In some aspects, the FD beam set may be based at least in part on the one or more candidate FD beam pairs specified by the first indication. Accordingly, and as part of the second indication, the second UE may indicate the first FD beam pair included in the FD beam set and/or the second FD beam pair included in the FD beam set. Based at least in part on receiving the second indication, the first UE may communicate one or more FD sidelink transmissions (e.g., transmitted by the first UE and/or transmitted by the second UE) with the second UE based at least in part on using the sidelink and FD beam set.

By indicating candidate FD beam pairs, the first UE may indicate FD beam pairs that reduce self-interference at the first UE and improve FD sidelink communications at the first UE. Alternatively, or additionally, indicating the candidate FD beam pairs enables the second UE to select an FD beam set that improves FD sidelink performance at the second UE. Improving FD sidelink performance may reduce recovery errors, increase throughput, reduce sidelink data transfer latencies, and/or improve sidelink bandwidth.

As indicated above, FIGS. 5A-5D are provided as one or more examples. Other examples may differ from what is described with regard to FIGS. 5A-5D.

Figure 6:
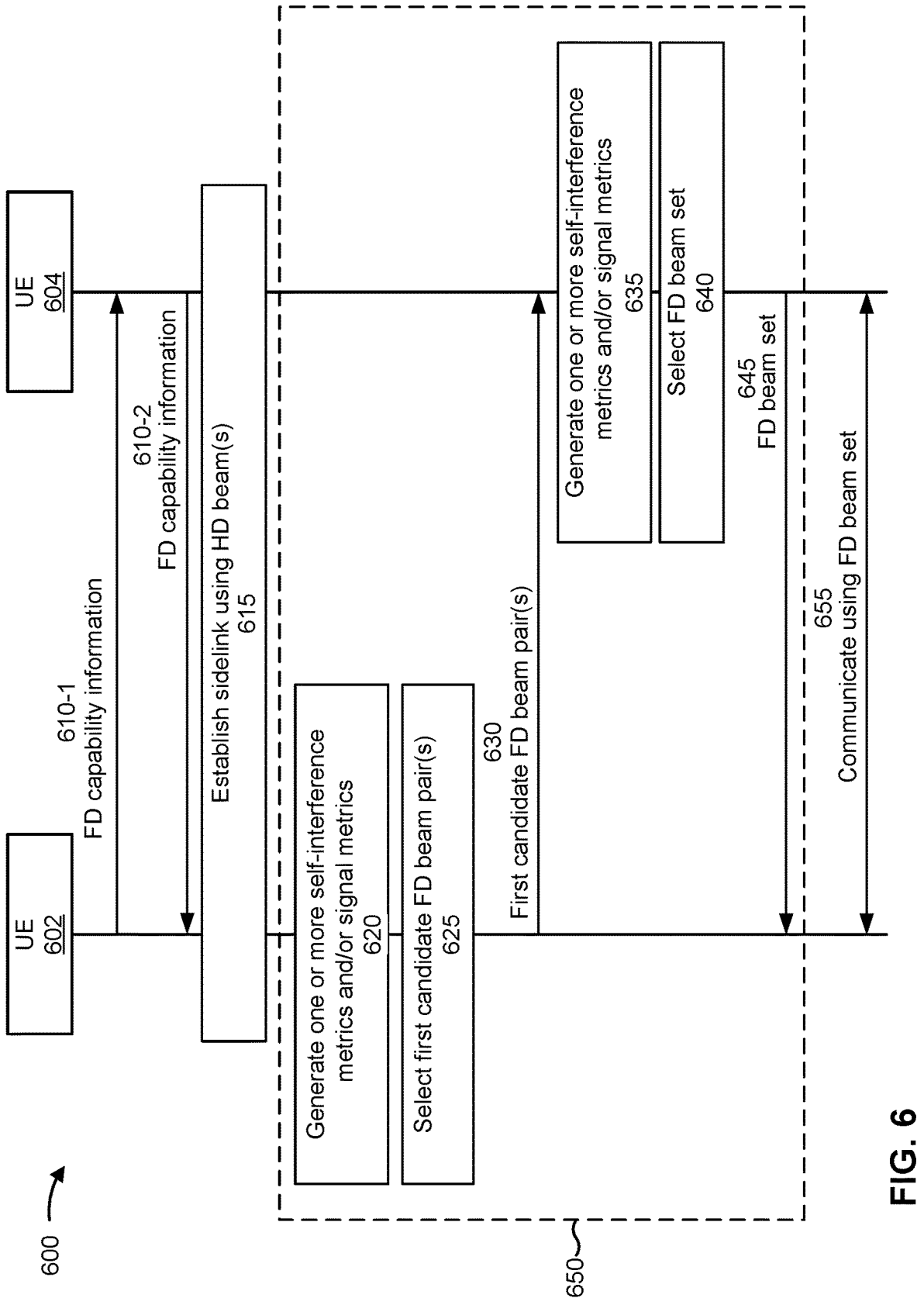
FIG. 6 is a diagram illustrating an example of a wireless communication process between a first UE and a second UE, in accordance with the present disclosure.

FIG. 6 is a diagram illustrating an example 600 of a wireless communication process between a first UE 602 (e.g., a UE 120) and a second UE 604 (e.g., another UE 120), in accordance with the present disclosure.

As shown by reference number 610-1, the first UE 602 may transmit, and the second UE 604 may receive, an indication of FD sidelink capability information associated with the first UE 602. Alternatively, or additionally, as shown by reference number 610-2, the second UE 604 may transmit, and the first UE 602 may receive, an indication of FD sidelink capability information associated with the second UE 604. As one example, the first UE 602 and/or the second UE 604 may transmit respective FD capability information as part of a sidelink discovery process, such as a sidelink discovery process associated with establishing a Mode 2 sidelink between two UEs. For instance, the first UE 602 and/or the second UE 604 may transmit the respective FD capability information in sidelink control information, such as by broadcasting the control information using a PSCCH. Alternatively, or additionally, the first UE 602 and/or the second UE 604 may transmit the respective FD capability information in a multicast message (also referred to as a groupcast message) and/or a unicast message based at least in part on using the PSCCH and/or a PSSCH. Accordingly, a UE may transmit and/or receive the FD sidelink capability information based at least in part on a sidelink.

The FD sidelink capability information may include, by way of example and not of limitation, one or more supported FD modes (e.g., an IBFD mode, a partially-overlapping IBFD mode, a fully-overlapping IBFD mode, and/or an SBFD mode), one or more supported link types for FD (e.g., a first link associated with sidelink FD, a second link associated with access link FD, a third link associated with a relay link FD for access-to-sidelink relaying, and/or a fourth link associated with sidelink FD for sidelink-to-sidelink relaying), a maximum number of FD beams for a supported link type (e.g., a sidelink, an access link, and/or a relay link), a maximum number of directional antenna ports supported for one or more transmission directions (e.g., a transmit direction and/or a receive direction), and/or one or more channel types (e.g., PSSCH and/or PSCCH) supported for FD. In some aspects, the transmission direction(s) may be associated with multiple antenna ports, and the FD capability information may specify multiple supported FD beam pairs. Accordingly, the FD sidelink capability information may specify a maximum number of antenna ports for one or more transmission directions applicable to FD communication and the one or more supported FD beam pairs may be linked to the antenna ports applicable to FD communication.

In some aspects, the first UE 602 and/or the second UE 604 may prioritize connecting with an FD-capable device. Transmitting and/or receiving FD sidelink capability information as part of the sidelink discovery process may enable the first UE 602 to identify that the second UE 604 is an FD-capable device, and select to connect with the second UE 604 based at least in part on the second UE 604 being FD-capable (and/or vice versa). Alternatively, or additionally, the first UE 602 and/or the second UE 604 may select to connect with one another based at least in part on identifying one or more common FD capabilities supported by each of the UEs. That is, the first UE 602 may identify a common FD capability that the first UE 602 and the second UE 604 both support, and determine to connect with the second UE 604 based at least in part on the common FD capability.

In some aspects, the first UE 602 and/or the second UE 604 may transmit the FD sidelink capability information as part of a radio resource control (RRC) setup procedure associated with a sidelink, either via an RRC message and/or a sidelink control message. To illustrate, the first UE 602 and/or the second UE 604 may transmit the FD sidelink capability information as part of the RRC setup procedure based at least in part on a use-case scenario, such as invocation and/or execution of an application at the UE that requests more data throughput and/or low data transfer latency relative to other applications. The first UE 602 and/or the second UE 604 may communicate the FD sidelink capability information as part of the RRC setup procedure as an implicit request to establish a sidelink connection with a connection configuration that supports FD. To illustrate, an SCI-2 communication between the first UE 602 and the second UE 604 may indicate a request for an FD sidelink connection. The FD sidelink capability information may be transmitted as a multi-cast message and/or a unicast message as described above.

Alternatively, or additionally, the first UE 602 and/or the second UE 604 may transmit the FD sidelink capability information after establishing an RRC connected state associated with the sidelink. For example, the first UE 602 and/or second UE 604 may delay transmitting FD sidelink capability information until detecting an event that may benefit from the use of FD sidelink communications, such as a first event associated with a request for a low data-transfer latency and/or a second event associated with high data throughput. To illustrate, an application may request the low data-transfer latency only when operating in and/or transitioning to a particular mode (e.g., a video communication enabled mode and/or navigation enabled mode). Accordingly, the first UE 602 and/or the second UE 604 may refrain from transmitting the FD sidelink capability information until identifying an event associated with using FD sidelink communications. The FD sidelink capability information may be transmitted as a multi-cast message and/or a unicast message, as described above.

In some aspects, the first UE 602 and/or the second UE 604 may transmit the FD sidelink capability information based at least in part on receiving a request for FD sidelink capability information from the other UE. As one example, the first UE 602 may transmit (e.g., based at least in part on using the sidelink) a request for FD sidelink capability information that is associated with the second UE 604. The request may be an implicit request, such as by the first UE 602 transmitting FD sidelink capability information to the second UE 604. That is, the first UE 602 may implicitly request FD sidelink capability information from the second UE 604 by transmitting the first UE 602's own FD sidelink capability information. Alternatively, or additionally, the request may be an explicit request, such as a bit field in control information and/or an enumeration field in an RRC message, a PSSCH message, and/or a PSCCH message that is set to a value that indicates a request for FD sidelink capability information. Accordingly, the first UE 602 may receive FD sidelink capability information from the second UE 604 based at least in part on transmitting the request.

As shown by reference number 615, the first UE 602 and the second UE 604 may establish one or more sidelinks based at least in part on one or more HD communication(s). For example, the first UE 602 may select a first HD transmit beam and/or the second UE 604 may select a first HD receive beam, for communication(s) associated with a first transmission direction that is from the first UE 602 to the second UE 604. That is, the first HD beam pair may be associated with the first transmission direction from the first UE 602 to the second UE 604 and/or include the first HD transmit beam and the first HD receive beam. Alternatively, or additionally, the second UE 604 may select a second HD transmit beam and/or the first UE 602 may select a second HD receive beam, for a second HD beam pair associated with communication(s) in a second transmission direction from the second UE 604 to the first UE 602.

Figure 8:
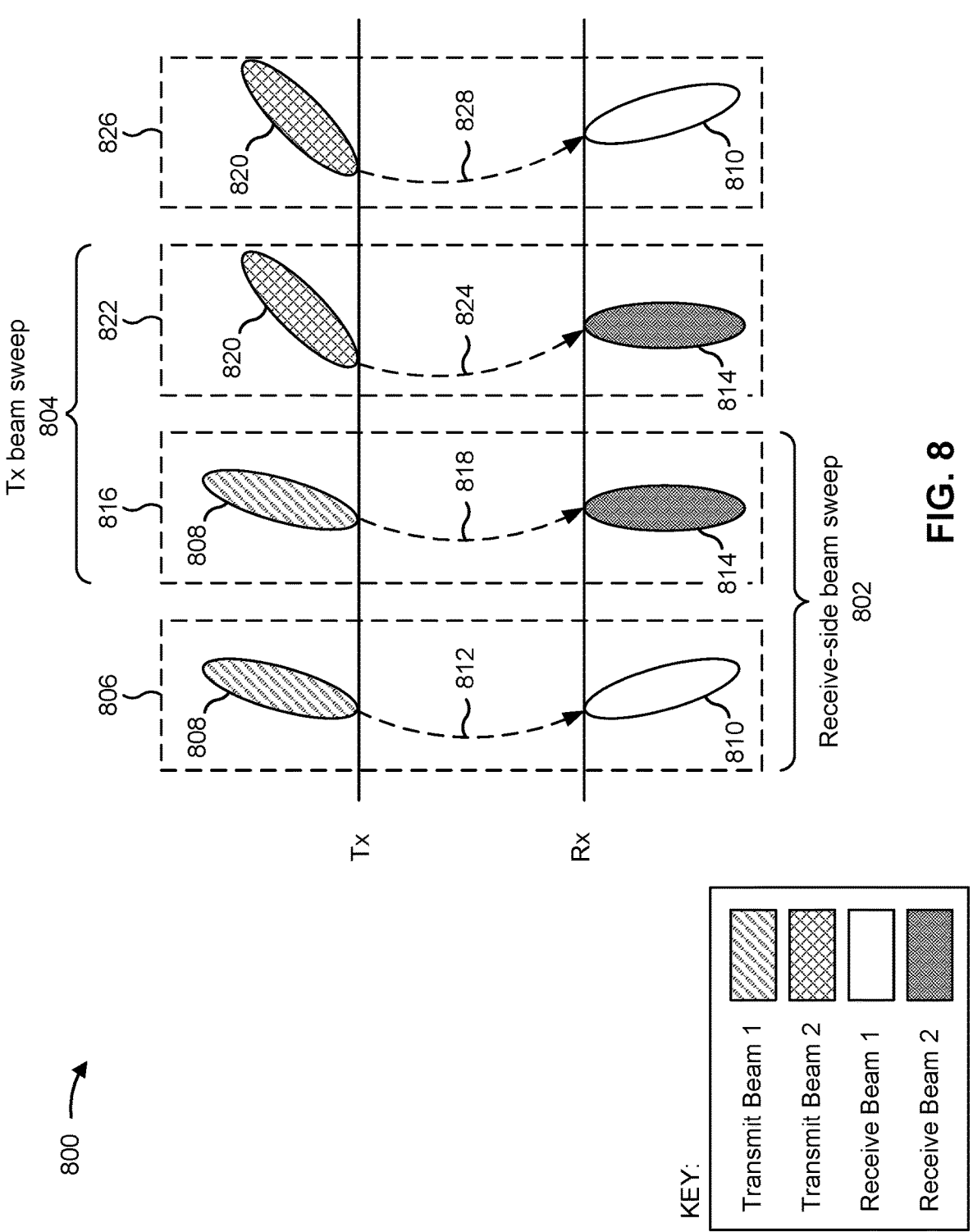
FIG. 8 is a diagram illustrating an example of beam sweeping procedures, in accordance with the present disclosure.

The first UE 602 and/or the second UE 604 may select each transmit and/or receive beam based at least in part on one or more beam sweeping procedures, as described with regard to FIG. 8. A transmit-side beam sweeping procedure may include a transmitting UE (e.g., the first UE 602 and/or the second UE 604) iteratively alternating between transmit beams in a set of transmit beams for transmitting a reference signal. A receive-side beam sweeping procedure may include a receiving UE (e.g., the second UE 604 and/or the first UE 602) iteratively alternating between receive beams in a set of receive beams for receiving the reference signal. To illustrate, the transmitting UE may transmit a sidelink signal synchronization block (SL-SSB), a narrowband channel state information reference signal (CSI-RS) that is within a configured bandwidth associated with a sidelink channel (e.g., PSSCH), and/or a wideband CSI-RS that has at least a portion of the CSI-RS outside of the configured bandwidth of the sidelink channel.

The receiving UE may generate a respective signal metric, such as an RSRP metric and/or an RSSI metric, based at least in part on receiving the reference signal and using a respective HD beam pair. In some aspects, the receiving UE may generate a first signal metric based at least in part on a configured bandwidth associated with the receive channel. To illustrate, the receiving UE may generate the RSRP metric by measuring at least a portion of an SL-SSB and/or a narrowband CSI-RS that is located within a configured bandwidth associated with a PSCCH used to transmit the SL-SSB and/or CSI-RS. Alternatively, or additionally, the receiving UE may generate a second signal metric based at least in part on a portion of spectrum that is outside of the configured bandwidth associated with the receive channel. For instance, the receiving UE may generate the RSRP metric (and/or another Layer 1 metric) based at least in part on a wideband CSI-RS that is located in one or more air interface resources outside of the configured bandwidth associated with the PSCCH.

To illustrate, the receiving UE may receive, using the sidelink and from the transmitting UE, reference signal configuration information that indicates a configuration of a reference signal, such as a carrier frequency, a frequency bandwidth, and/or a start time. The transmitting UE may transmit, and the receiving UE may receive, the reference signal based at least in part on the reference signal configuration information. Accordingly, the receiving UE may generate a signal metric (e.g., RSRP) based at least in part on the reference signal and the reference signal configuration information. In some aspects, the reference signal configuration information may indicate that at least a portion of the reference signal is outside of a configured bandwidth, and the receiving UE may generate the signal metric based at least in part on measuring the at least a portion of the reference signal that is outside of the configured bandwidth.

The receiving UE may select an HD receive beam that results in better received signal quality (e.g., a higher RSRP) at the receiving UE relative to other HD receive beams.

Alternatively, or additionally, the receiving UE may transmit feedback (e.g., a measurement report and or a measurement metric) to the transmitting UE to enable the transmitting UE to select a transmit beam that results in better received signal quality at the receiving UE. To illustrate examples of beam sweeping procedures, the first UE 602 and/or the second UE 604 may perform any combination of a sidelink P1 beam sweeping procedure (e.g., an initial beam selection of a transmit beam and/or a receive beam), a sidelink P2 beam sweeping procedure (e.g., a refinement to an initial transmit beam selection), and/or a sidelink P3 beam sweeping procedure (e.g., a refinement to an initial receive beam selection). In some aspects, the sidelink P1 beam sweeping procedure, the sidelink P2 beam sweeping procedure, and/or the sidelink P3 beam sweeping procedure may include reference signal transmission(s), the generation of signal metric(s), and/or transmission of feedback from a first device to a second device, such as in a manner similar to a P1 beam sweeping procedure, a P2 beam sweeping procedure, and/or a P3 beam sweeping procedure for selection of a first beam for a downlink transmission, a second beam for downlink reception, a third beam for uplink transmission, and/or a fourth beam for uplink reception. As described above, the HD beam pair(s) may be selected to improve HD communication performance (e.g., reduce data-transfer latencies, reduce recovery errors, and/or increase data throughput) relative to other beam selections.

Based at least in part on selecting the HD beam pair(s), the first UE 602 and/or the second UE 604 may communicate with one another using the sidelink and/or air interface resource pool selection (e.g., Mode 2 communications). For instance, the first UE 602 may transmit, and the second UE 604 may receive, a sidelink communication based at least in part on a first HD beam pair and a first sidelink air interface resource reserved by the first UE 602. Alternatively, or additionally, the second UE 604 may transmit, and the first UE 602 may receive, a second sidelink communication based at least in part on a second HD beam pair and a second sidelink air interface resource reserved by the second UE 604. Accordingly, the first UE 602 and/or the second UE 604 may communicate with one another using serial HD sidelink transmissions.

As shown by reference number 620, the first UE 602 may generate one or more self-interference metrics and/or signal metrics based at least in part on the one or more HD sidelink transmission(s). In some aspects, and as shown in the example 600, the first UE 602 may begin generating the self-interference metrics prior to the second UE 604. In other aspects, the first UE 602 and the second UE 604 may generate self-interference metrics in parallel, such as described with regard to example 700 of FIG. 7.

Generating self-interference metrics (and, subsequently, candidate FD beam pairs, as described below) in a serial manner enables the first UE 602 to provide the second UE 604 with FD beam pairs that are preferred by the first UE 602. Accordingly, the second UE 604 may evaluate candidate FD beam pair(s) based at least in part on beams identified by the first UE 602 as beams that improve FD sidelink communications (e.g., by reducing self-interference). To illustrate, and using communication channel reciprocity, the second UE 604 may select a receive beam to analyze based at least in part on a candidate FD transmit beam in an FD beam pair that is preferred by the first UE 602. By evaluating beams that are based at least in part on a preferred beam selected by the first UE 602, the second UE 604 may identify beams that are complementary and/or compatible to the preferred beam. However, generating self-interference metrics and/or selecting candidate FD beam pairs in parallel as described with regard to the example 700 may reduce a duration of the beam selection process. Reducing the duration of the beam selection process may enable the first UE 602 and the second UE 604 to begin FD sidelink communications more quickly.

In some aspects, a hierarchy of which UE selects an initial set of candidate FD beam pairs that another UE uses to evaluate additional FD beam pairs may be based at least in part on which UE transmits an indication of the candidate FD beam pair(s) first. For instance, the first UE 602 may begin generating self-interference metrics before the second UE 604 and, subsequently, transmit a first indication of candidate FD beam pair(s) to the second UE 604 before the second UE 604 transmits a second indication of candidate FD beam pair(s) (e.g., selected by the second UE 604) to the first UE 602. Accordingly, the second UE 604 may begin generating self-interference metric(s) based at least in part on receiving the first indication from the first UE 602.

Figure 7:
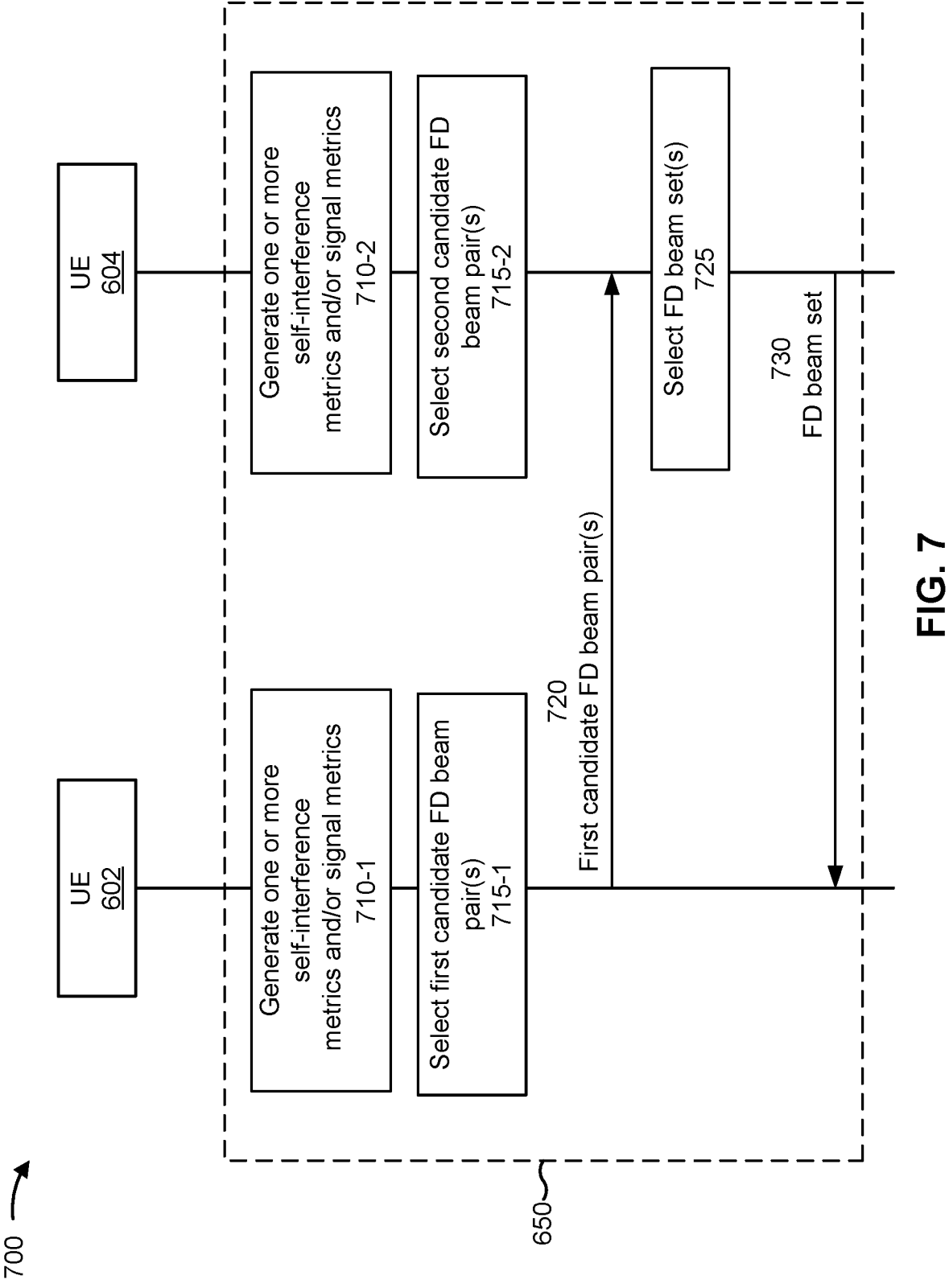
FIG. 7 is a diagram illustrating an example of a wireless communication process between the first UE and the second UE, in accordance with the present disclosure.

Alternatively, or additionally, the second UE 604 may be generating self-interference metrics and/or selecting candidate FD beam pairs in parallel with and/or independently from the first UE 602, as described with regard to the example 700 of FIG. 7. The second UE 604 may cease performing an independent candidate FD beam selection process (e.g., generating the self-interference metrics and selecting candidate FD beam pairs), and start a candidate FD beam selection process based at least in part on the candidate FD beam pairs indicated by the first UE 602. In a case where the UEs transmit respective indications at contemporaneous times, a UE identifier (ID) as described below may break the deadlock as to which UE transmits first and which UE waits to receive the first candidate FD beam pair set. To illustrate, an odd UE ID may have priority over an even UE ID or vice versa. That is, each UE may begin generating self-interference metrics and/or a candidate FD beam selection process at random points in time, and a UE ID may be used to break a deadlock of which UE has priority in the hierarchy if the UEs transmit the indications of candidate FD beam pairs at contemporaneous times.

Which UE initiates the candidate FD beam selection process may alternatively or additionally be based at least in part on a respective UE ID assigned to each UE. To illustrate, the first UE 602 and the second UE 604 may each receive a UE ID assignment during a sidelink RRC setup procedure. In a similar manner as described with regard to a deadlock, the UE that initiates the generation of self-interference metrics and, subsequently, the candidate FD beam selection process, may be based at least in part on the UE ID. For example, the UE with an odd UE ID (or vice versa for an even UE ID) may initiate generation of self-interference metrics and the candidate FD beam selection process.

The first UE 602 may generate one or more self-interference metrics based at least in part on the HD communications described with regard to reference number 615. Alternatively or additionally, the first UE 602 may generate the self-interference metrics based at least in part on one or more beam-sweeping procedures as described with regard to FIG. 8 and/or using one or more different measurement bands as described with regard to FIGS. 9A, 9B, and 9C. For example, the first UE 602 may generate the self-interference metrics based at least in part on ongoing HD communications (e.g., HD communications that includes data traffic) based at least in part on using one or more HD transmit beam(s) that the first UE 602 has identified for HD (transmit) communications (e.g., via a sidelink P1 sidelink beam sweeping procedure and/or a sidelink P2 beam sweeping procedure) and/or one or more HD receive beams) that the first UE 602 has identified for HD (receive) communications.

To illustrate, the first UE 602 may generate a self-interference metric based at least in part on using a current HD transmit beam (e.g., identified as described with regard to reference number 615) and performing a receive-side beam sweeping procedure that pairs the current HD transmit beam with one or more receive beams. The receive-side beam sweeping procedure may include the first UE 602 iterating through multiple HD receive beams (e.g., identified as described with regard to reference number 615) based at least in part on receiving multiple HD communications, such as data traffic, from the second UE 604. Alternatively, or additionally, the first UE 602 may generate self-interference metric(s) based at least in part on performing a transmit-side beam sweeping procedure in which the first UE 602 iterates through HD transmit beams (e.g., identified as described with regard to reference number 615) for transmitting one or more HD communications, such as data traffic, to the second UE 604.

Accordingly, the first UE 602 may generate self-interference metrics based at least in part on performing a receive-side beam sweeping procedure that iteratively changes a beam pairing of an HD transmit beam and a respective receive beam in a set of receive beams. That is, the first UE 602 may generate one or more self-interference metrics for each beam pairing. Alternatively, or additionally, the first UE 602 may perform a transmit-side beam sweeping procedure that iteratively changes a beam pairing of a receive beam with a respective transmit beam included in a set of transmit beams. In a similar manner as described above, the first UE 602 may generate self-interference metric(s) based at least in part on the beam pairing of the receive beam and the respective transmit beam. In some examples, the first UE 602 may perform a receive-side beam sweeping procedure together with a transmit-side beam sweeping procedure such that the first UE 602 iteratively changes the receive beam included in the beam pairing after iteratively cycling through each transmit beam in the set of transmit beams.

Based at least in part on operating using Mode 2 sidelink communications, the first UE 602 may reserve one or more sidelink air interface resources for a data transmission based at least in part on the transmit-side beam sweeping procedure and/or the receive-side beam sweeping procedure. For instance, the first UE 602 may generate signal metric(s) and/or self-interference metric(s) based at least in part on the sidelink air interface resource(s), such as by measuring a signal and/or interference that uses the sidelink air interface resource(s). The first UE 602 may reserve the sidelink air interface resources for a future transmission based at least in part on the signal metrics and/or self-interference metrics. Alternatively, or additionally, the first UE 602 may transmit a signal using the reserved sidelink air interface resource(s) and generate a self-interference metric based at least in part on transmitting the signal.

In some aspects, the first UE 602 may select one or more receive beams to include in a receive-side beam sweeping procedure by selecting receive beams that are associated with a signal metric that satisfies a quality threshold. For example, prior to performing the receive-side beam-sweeping procedure associated with identifying candidate FD beam pairs, the first UE 602 may generate a signal metric (e.g., SNR and/or RSRP) for a receive beam as part of establishing the HD communication link as described with regard to reference number 615. To illustrate, the first UE 602 may generate a signal metric for the receive beam based at least in part on using the receive beam to receive an SL-SSB transmission and/or an SL CSI-RS from the second UE 604. Accordingly, the first UE 602 may include the receive beam in the receive-side beam sweeping procedure based at least in part on the signal metric (e.g., generated during the establishment of the HD communication link) satisfying the quality threshold. In some aspects, a UE (e.g., the first UE 602 and/or the second UE 604) may select, as the receive beam, a receive beam that is quasi-co-located (QCL-ed) with the SL CSI-RS.

The first UE 602 may transmit, prior to performing a transmit beam-sweeping procedure, and to the second UE 604, a request for a preferred beam report and/or a self-interference report. That is, the first UE 602 may request that the second UE 604 evaluate one or more transmit beams included in a previous or separate transmit beam-sweeping procedure, and indicate, in the preferred beam report, K best transmit beams selected by the second UE 604 for HD communications with the first UE 602, where K is an integer. To illustrate, the first UE 602 may iteratively alternate between transmit beams in a set of M HD transmit beams for transmitting HD communication(s) and/or a reference signal as described with regard to reference number 615, where M is a second integer. The second UE 604 may generate a respective signal metric for each transmit beam (e.g., M signal metrics) and select a subset of transmit beams (e.g., K transmit beams) associated with a higher signal quality relative to other transmit beams. To illustrate, the second UE 604 may select an HD receive beam for receiving the HD communication(s) and/or reference signal, and generate a respective SNR metric for each HD transmit beam. Accordingly, the second UE 604 may transmit a preferred beam report that indicates the K (preferred) HD transmit beams selected by the second UE 604 (and based at least in part on the HD receive beam used by the second UE 604). Alternatively, or additionally, the second UE 604 may report respective signal metrics (e.g., SNR) for each preferred transmit beam.

In some aspects, the first UE 602 may request a preferred beam report from the second UE 604 that indicates one or more candidate and/or preferred transmit beams used by the second UE 604. That is, the preferred beam report may indicate one or more transmit beams associated with the second UE 604 transmitting a communication, and the first UE 602 may select a receive beam based at least in part on the transmit beam(s) associated with the second UE 604. Alternatively or additionally, the second UE 604 may indicate self-interference report that includes one or more self-interference metrics and/or signal metric(s) for each transmit beam of the second UE 604. Accordingly, the second UE 604 may indicate, in a preferred beam report, one or more preferred transmit beams and associated signal metrics and/or self-interference metrics. While the example above describes the first UE 602 requesting the preferred beam report, and the second UE 604 generating the preferred beam report, other example may alternatively, or additionally, include the second UE 604 requesting a preferred beam report (and/or a self-interference report) from the first UE 602, and the first UE 602 generating the preferred beam report (and/or the self-interference report).

Figures 9A, 9B, 9C:
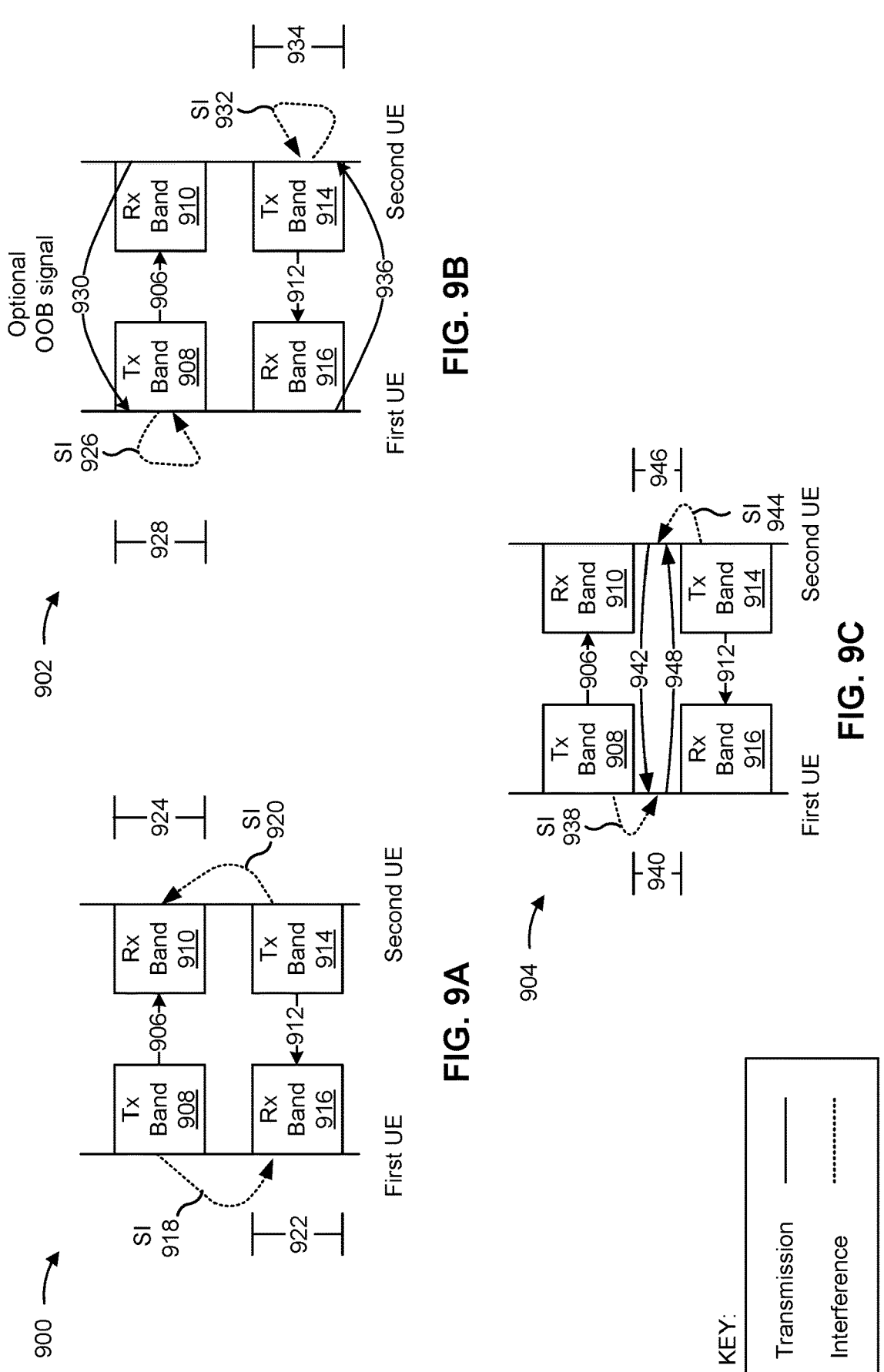
FIGS. 9A, 9B, and 9C are diagrams illustrating a first example, a second example, and a third example of self-interference measurements, in accordance with the present disclosure.

In some aspects, the first UE 602 may generate a self-interference metric as described with regard to FIGS. 9A, 9B, and/or 9C using at least a portion of an HD sidelink transmission. To illustrate, the first UE 602 may generate a self-interference metric (e.g., an RSSI metric) based at least in part on transmitting an HD sidelink transmission (e.g., to the second UE 604) and measuring interference that is observed in at least a portion of a sidelink receive channel bandwidth that is associated with the first UE 602, a portion of a sidelink transmit channel bandwidth associated with the first UE 602, and/or another frequency band that is located outside of the sidelink transmit channel bandwidth and the sidelink receive channel bandwidth. As described above, the first UE 602 may generate the self-interference metric(s) based at least in part on ongoing HD communications. The first UE 602 may generate the self-interference metric based at least in part on a transmit beam (e.g., a current HD transmit beam and/or a candidate FD transmit beam), a receive beam (e.g., a current HD receive beam and/or a candidate FD receive beam), and/or a frequency band, as described with regard to FIGS. 9A, 9B, and 9C.

In some aspects, the first UE 602 may generate a joint quality metric (e.g., a signal-to-interference-plus-noise ratio (SINR) metric) for an FD beam pair based at least in part on generating a self-interference metric and a signal metric using a transmit beam and a receive beam in the FD beam pair. As one example, the first UE 602 may generate an RSRP signal metric based at least in part on a (respective) HD sidelink transmission (e.g., a data traffic HD sidelink transmission and not a reference signal) that includes a multiplexed DMRS and is located within a configured bandwidth associated with a sidelink receive channel (e.g., a configured sidelink receive channel bandwidth). Alternatively, or additionally, the first UE 602 and/or the second UE 604 may generate an RSSI signal metric based at least in part on a (respective) HD sidelink transmission that lacks the multiplexed DMRS and is located within the configured sidelink receive channel bandwidth. In some aspects, the first UE may generate an RSRP based at least in part on an SL-SSB transmitted by the second UE 604. The first UE 602 may generate the signal metric(s) as described above using the receive beam. Alternatively or additionally, the first UE 602 may generate the self-interference metric by transmitting a signal using the transmit beam and measuring interference using the receive beam.

As shown by reference number 625, the first UE 602 may select one or more first candidate FD beam pairs. As described above, an FD beam pair may be associated with a single device for FD sidelink communications, such as a first FD beam pair that includes an FD transmit beam and an FD receive beam associated with the first UE 602, and/or a second FD beam pair that includes a second FD transmit beam and a second FD receive beam associated with the second UE 604. In some aspects, the first UE 602 may select the candidate FD beam pairs based at least in part on the self-interference metric(s) and/or joint quality metric(s) that are generated as described with regard to reference number 620.

For example, the first UE 602 may evaluate M FD beam pairs as described with regard to reference number 620, and select N candidate FD beam pairs that are associated with the lowest self-interference metric(s) and/or the highest received SINR in FD communications or a similar quality metric for signal or interference, where M and N are integers. That is, the first UE 602 may select a subset of candidate FD beam pairs from a set of candidate FD beam pairs evaluated by the first UE 602. Alternatively, or additionally, the first UE 602 may determine a rank order for the N candidate FD beam pairs, such as by ranking the N candidate beam pairs based at least in part on a respective self-interference metric and/or a respective quality metric of each candidate FD beam pair. To illustrate, the first UE 602 may rank a first candidate FD beam pair used to generate a first self-interference metric higher than a second candidate FD beam pair used to generate a second self-interference metric based at least in part on the first self-interference metric being lower than the second self-interference metric. As another example, the first UE 602 may rank a third candidate FD beam pair used to generate a first quality metric (e.g., SINR) higher than a second candidate FD beam pair used to generate a second quality metric that is lower than the first self-interference metric.

As shown by reference number 630, the first UE 602 may transmit, and the second UE 604 may receive, an indication of the one or more first candidate FD beam pairs. To illustrate, the first UE 602 may transmit the indication in a sidelink control message. Alternatively, or additionally, the first UE 602 may indicate the candidate FD beam pairs by indicating a respective beam index (e.g., a synchronization signal block (SSB) beam index and/or a CSI-RS beam index) of each candidate FD transmit beam and each candidate FD receive beam in the candidate FD beam pairs. In some aspects, the first UE 602 may indicate, for each candidate FD beam pair, a respective rank, a respective signal metric, a respective self-interference metric, and/or a respective quality metric that indicates a performance quality of the FD beam pair. In some aspects, a quality metric may be a joint quality metric that is based at least in part on a signal metric, a self-interference metric, and the beams included in the FD beam pair used to generate the metrics. In other aspects, the first UE 602 may omit self-interference, signal, and/or quality metric(s) from the indication to specify and/or indicate that the candidate FD beam pairs have commensurate performance quality (e.g., within a range of values and/or within a threshold).

As shown by reference number 635, the second UE 604 may generate one or more self-interference metrics, such as by using techniques as described with regard to reference number 620. To illustrate, the second UE 604 may perform a receive-side beam sweeping procedure and/or a transmit side beam sweeping procedure using HD communications with the first UE 602. In some aspects, the second UE 604 may select candidate FD beam pairs (e.g., transmit beams and/or receive beams) based at least in part on the candidate FD beam pairs indicated by the first UE 602. To illustrate, and as described above, the second UE 604 may select a transmit beam and/or a receive beam to evaluate (e.g., using self-interference metric(s)) based at least in part on the candidate FD beam pairs indicated by the first UE 602 and communication channel reciprocity. Alternatively or additionally, the second UE 604 may select a second set of candidate FD beam pairs independent of the first set of candidate FD beam pairs, such as by selecting transmit beams and/or receive beams using signal metrics generated during the establishment of an HD communication link. In some aspects, and as described above, the second UE 604 may request a preferred beam report from the first UE 602, and select the second set of candidate FD beam pairs based at least in part on the preferred beam report.

To illustrate, the second UE 604 may generate self-interference metric(s) for one or more transmit and/or receive beams indicated in and/or associated with the first set of candidate FD beam pairs during the establishment of the HD communication link, and include the transmit and/or receive beams in beam sweeping procedures used to evaluate FD beam pairs. In some aspects, the second UE 604 may generate the self-interference metric(s) during beamformed SSB transmission(s) by the second UE 604 and based at least in part on one or more receive beams. Alternatively, or additionally, the second UE 604 may identify one or more unevaluated transmit and/or receive beams indicated in the first set of candidate FD beam pairs (e.g., transmit and/or receive beams without a self-interference metric generated by the second UE 604). Accordingly, the second UE 604 may schedule one or more HD communications with the unevaluated transmit beams, measure self-interference with the unevaluated receive beams, and thus generate self-interference metrics(s) for the unevaluated transmit and/or receive beams. Based at least in part on using existing self-interference metrics and/or based at least in part on scheduling HD communications and generating additional self-interference metrics, the second UE 604 may generate a joint quality metric (e.g., SINR) for the first set of candidate FD beam pairs and/or the second set of candidate FD beam pairs.

As shown by reference number 640, the second UE 604 may select one or more FD beam sets. In some aspects, the second UE 604 may select candidate FD beam sets (e.g., to provide to the first UE 602 for a final selection for FD sidelink communications or to have some FD beam pairs as backup to use in case of a beam failure). Alternatively, or additionally, the second UE 604 may select one or more FD beam sets that the second UE 604 assigns to FD sidelink communications (e.g., as a final selection). In a similar manner as described with regard to reference number 625, the second UE 604 may select the FD beam set(s) based at least in part on the self-interference metric(s) and/or joint quality metric(s) that are generated as described with regard to reference number 635. That is, the second UE 604 may evaluate the first set of candidate FD beam pairs and/or the second set of candidate FD beam pairs based at least in part on self-interference metrics, signal metrics, and/or quality metrics that are generated based at least in part on using HD communications as described above. In some aspects, the second UE 604 may output one or more selected and/or finalized FD beam sets based at least in part on the first set of candidate FD beam pairs and/or the second set of candidate FD beam pairs.

The second UE 604 may select multiple FD beam sets, such as a first FD beam set for a first sidelink communication channel (e.g., PSCCH), a second FD beam set for a second sidelink communication channel (e.g., PSSCH), and/or a third FD beam set for a third sidelink communication channel (e.g., PSFCH). In some aspects, the second UE 604 may select an FD beam set based at least in part on mitigating self-interference at both the first UE and the second UE. To illustrate, the second UE 604 may select an FD beam set based at least in part on jointly optimizing a first signal metric and/or a first self-interference metric at the first UE and a second signal metric and/or a second self-interference metric at the second UE. That is, the second UE 604 may select a first FD beam pair that reduces self-interference at both the first UE and the second UE instead of a second FD beam pair that only reduces self-interference at the second UE. Jointly optimizing the selection of an FD beam set may improve FD sidelink communications at both UEs. In some aspects, the first UE 602 may indicate, with the candidate FD beam pairs, any combination of signal metrics, self-interference metrics, SINR metrics and or quality metrics for each candidate FD beam pair. The second UE 604 may also generate such metrics during its self-interference measurement step 635 for the same candidate FD beam pair. The second UE 604 may then select an FD beam set based at least in part on identifying FD beam pairs that satisfy a quality threshold (e.g., an SINR) for both UEs instead of an FD beam set satisfying the quality threshold only for the second UE 604. For e.g., by selecting a FD beam pair for which the receive SINR metric is high at both the first UE 602 and the second UE 604, the second UE 604 may ensure that the communication quality at both UEs is jointly optimized. As an example of joint optimization of a SINR metric at both UEs, the second UE 604 may select a FD beam pair that maximizes the minimum among both UE's SINR metrics. That is, the FD beam set includes a first FD beam set associated with the first UE 602 that satisfies the quality threshold and a second FD beam set associated with the second UE 604 that satisfies the quality threshold. Alternatively or additionally, the second UE 604 may select the FD beam pairs included in the FD beam set by selecting FD beam pairs which satisfy a performance threshold (e.g., SINR greater than a threshold) based at least in part on the first set of candidate FD beam pairs and the second set of FD beam pairs. That is, the second UE 604 may select the FD beam pairs included in the FD beam set out of the first set of candidate FD beam pairs and/or the second set of FD beam pairs.

The second UE 604 may select, for an FD beam set, multiple FD beam pairs and/or rank the multiple candidate FD beam pairs. For example, during a sidelink RRC setup procedure, the first UE 602 and the second UE 604 may select and/or coordinate a maximum number of FD beam pairs to communicate. Alternatively or additionally, the maximum number may be based at least in part on a communication standard. The second UE 604 may select up to the maximum number of FD beam pairs as described above (e.g., using a quality threshold) and rank each FD beam pair based at least in part on a quality of the FD beam pair, such as ranking a first FD beam pair higher than a second FD beam pair based at least in part on the first FD beam pair having less self-interference and/or higher SINR than a second FD beam pair.

As shown by reference number 645, the second UE 604 may transmit, and the first UE 602 may receive, an indication of one or more FD beam pairs (e.g., that are associated with an FD beam set). To illustrate, the second UE 604 may transmit the indication of the FD beam set and/or FD beam pair(s) associated with the FD beam set using the PSCCH. In some aspects, the indication may specify one or more FD beam pairs included as part of the FD beam set, such as a first FD beam pair (e.g., a first FD sidelink transmit beam and a first FD sidelink receive beam) that is associated with FD communications by the first UE 602 and/or a second FD beam pair associated with FD communications by the first UE 602. In some aspects, the indication may implicitly indicate a selected FD beam pair for the second UE 604. To illustrate, the indication may only explicitly indicate selected FD beam pairs that are associated with the first UE, and the second UE may derive a selected FD beam that is associated with the second UE 604. For example, the second UE may select a corresponding FD beam pair (e.g., for communications by the second UE 604) for each FD beam pair associated with the first UE 602. Accordingly, the indication may implicitly indicate to use the corresponding FD beam pair (e.g., associated with FD sidelink communications by the second UE 604) based at least in part on explicitly indicating an FD beam pair selection for the first UE 602. However, and as described above, the FD beam set may include more than two FD beam pairs and, accordingly, the indication may indicate more than two FD beam pairs. As described above, the FD beam pairs included in the FD beam set (e.g., selected by the second UE 604) may be based at least in part on the candidate FD beam pair(s) indicated by the first UE 602.

The second UE 604 may indicate multiple FD beam sets and/or sidelink communication channels associated with each FD beam set. Each sidelink communication channel may be associated with a respective FD beam set, or multiple sidelink communication channels may be associated with a single FD beam set. In some aspects, the second UE 604 may indicate multiple candidate FD beam sets, multiple candidate FD beam pairs, a rank of each candidate FD beam set (or candidate FD beam pair), and/or a quality metric associated with each candidate FD beam set (or candidate FD beam pair). A number of FD beam sets returned by the second UE 604 may indicate whether the FD beam sets are candidate FD beam sets or a final selection. To illustrate, the second UE 604 may indicate a single FD beam set to specify that the FD beam set is a final selection. As another example, the second UE 604 may indicate multiple FD beam sets to specify that the FD beam sets are candidate FD beam sets. The FD beam sets may be listed in an order that specifies preference (e.g., a first FD beam set in a list is a first and/or highest preference and a second FD beam set in the list is a second and/or lower preference).

Reference number 650 illustrates a group of actions that may be performed by the first UE 602 and the second UE 604 to select an FD beam set for FD sidelink communications. In the example 600, the group of actions are based at least in part on the first UE 602 and the second UE 604 generating self-interference metrics and/or selecting candidate FD beam pairs in a serial manner (e.g., one before the other). In other examples, such as example 700 as described with regard to FIG. 7, the first UE 602 and the second UE 604 may generate self-interference metrics and/or select candidate FD beam pairs in parallel.

As shown by reference number 655, the first UE 602 and the second UE 604 may communicate using the sidelink and the FD beam set. That is, the first UE 602 and the second UE 604 may switch from transmitting and/or receiving HD sidelink communications, to transmitting and/or receiving FD sidelink communications based at least in part on the FD beam set. Alternatively or additionally, the first UE 602 and the second UE 604 may communicate in an FD mode based at least in part on a common FD sidelink capability that is supported by the first UE 602 and the second UE 604. To illustrate, the first UE 602 may indicate, in the capability information as described with regard to reference umber 610-1, support for IBFD and SBFD, and the second UE 604 may indicate, in the capability information as described with regard to reference umber 610-2, support for SBFD. Accordingly, the first UE 602 and the second UE 604 may communicate FD sidelink communications using SBFD that is common to both the first UE 602 and the second UE 604.

The first UE 602 and/or the second UE 604 may switch from HD sidelink communications to FD sidelink communications without performing any further sensing and/or FD beam analysis for the switch (but may perform further sensing and/or FD beam analysis for updates to the FD beam pair). As one example, the first UE 602 and the second UE 604 may coordinate a switch period during the sidelink RRC setup procedure. Alternatively or additionally, a communication standard may specify a switch period. As one example of a switch period, the second UE 604 may switch to using FD sidelink communications X milliseconds (msec) and/or Y slots after sending the indication as described with regard to reference number 645, where X represents a real number and Y represents an integer. Alternatively or additionally, the first UE 602 may switch to using FD sidelink communications X msec and/or Y slots after receiving the indication as described with regard to reference number 645. In some aspects, switching to FD sidelink communications may include the first UE 602 and the second UE 604 beginning FD transmissions, after expiration of X msec. and/or Y slots, based at least in part on using one or more symbols or slots that overlap in at least the time domain. Alternatively, or additionally, the FD transmissions may overlap at least in part in the frequency domain.

The first UE 602 and the second UE 604 may coordinate a frequency bandwidth for FD sidelink communications. As one example, the first UE 602 and the second UE 604 may coordinate a frequency bandwidth for FD sidelink communications during a sidelink RRC setup procedure. Alternatively, or additionally, the first UE 602 and the second UE 604 may coordinate the frequency bandwidth for FD sidelink communications based at least in part on UE capability information. In some aspects, the first UE 602 and the second UE 604 may coordinate the frequency bandwidth for FD sidelink communications based at least in part on a frequency configuration (e.g., IBFD partially overlapping transmit frequency bands, IBFD fully-overlapping transmit frequency bands, and/or SBFD non-overlapping transmit frequency sub-bands) associated with measurement of self-interference for an FD beam set).

In some aspects, the switch to FD sidelink communication may include a switch in a frequency bandwidth such that the first UE 602 and the second UE 604 switch from using a first frequency bandwidth for HD communications to using a second frequency bandwidth for FD sidelink communications. Alternatively, or additionally, switching to FD sidelink communications may include a switch to SBFD, partially-overlapping IBFD, and/or fully-overlapping IBFD, and a switch in frequency bandwidth may be based at least in part on an FD mode (e.g., a first frequency bandwidth for SBFD, a second frequency bandwidth for partially-overlapping IBFD, and/or a third frequency bandwidth for fully-overlapping IBFD).

In some aspects, a frequency bandwidth used by the first UE 602 and the second UE 604 to transmit and/or receive FD sidelink communications may be a same frequency band as a measurement frequency bandwidth used to generate one or more self-interference metrics as described with regard to FIGS. 9A, 9B, and 9C. Alternatively, or additionally, the frequency bandwidth used to transmit and/or receive the FD sidelink communications may be independent of the measurement frequency bandwidth. That is, the first UE 602 and/or the second UE 604 may select one or more FD beam pairs based at least in part on self-interference metric(s) generated using a measurement frequency bandwidth and/or measurement frequency sub-band, and use the FD beam pair(s) to transmit and receive FD sidelink communications in a frequency bandwidth and/or frequency sub-band that is different from the measurement frequency bandwidth and/or measurement frequency sub-band.

The first UE 602 and the second UE 604 may switch to FD sidelink communications after expiration of a specified duration and without further confirmation from the other UE. In some aspects, the second UE 604 may fail to receive an FD transmission from the first UE 602. Based at least in part on failing to receive the FD transmission, the second UE 604 may resend the indication of the FD beam set(s). After a number P of retransmissions of the indication (where P is an integer), the second UE 604 may revert back to HD sidelink communications and/or reestablish the sidelink with the first UE 602.

Based at least in part on switching to FD sidelink communications, the first UE 602 and/or the second UE 604 may use a respective FD beam pair for channel sensing. In some aspects, and based at least in part on operating using Mode 2 communications, the first UE 602 and/or the second UE 604 may perform resource selection and/or scheduling by sensing channel availability for transmissions based at least in part on the respective FD beam pair. To illustrate, the first UE 602 and/or the second UE 604 may generate an S-RSSI metric, a PSSCH-RSRP metric, and/or a PSSCH-RSRQ metric based at least in part on the respective FD beam pair, and a channel and/or reserve sidelink resources based at least in part on the measurement metric(s). In some aspects, the first UE 602 and the second UE 604 may select the sidelink air interface resource(s) prior to switching to using FD sidelink communications, while in other aspects, the first UE 602 and the second UE 604 may refrain from channel sensing using the FD beam pair until after expiration of a duration as described above.

Jointly selecting at least one FD beam pair based at least in part on self-interference measurements associated with ongoing HD communications may enable a UE to identify FD beam pair(s) that reduce self-interference at the UE. Coordinating selection of an FD beam set may improve FD sidelink performance at UEs communicating over the sidelink using an FD mode. Improving FD sidelink performance may reduce recovery errors, reduce sidelink data transfer latencies, and/or improve sidelink bandwidth.

As indicated above, FIG. 6 is provided as an example. Other examples may differ from what is described with regard to FIG. 6.

FIG. 7 is a diagram illustrating an example 700 of a wireless communication process between the first UE 602 and the second UE 604 as described with regard to FIG. 6, in accordance with the present disclosure. As shown by reference number 650, the example 700 may include a group of actions performed by the first UE 602 and the second UE 604 to select an FD beam set for FD sidelink communications. In the example 700, the group of actions are based at least in part on the first UE 602 and the second UE 604 generating self-interference metrics and/or selecting candidate FD beam pairs in parallel.

As shown by reference number 710-1 and reference number 710-2, the first UE 602 and the second UE 604 may generate one or more self-interference metrics and/or one or more signal metrics in parallel. To illustrate, and as described above with regard to reference number 620 and reference number 635 of FIG. 6, the first UE 602 and/or the second UE 604 may generate self-interference metric(s) using ongoing HD sidelink communications, a respective transmit-side beam sweeping procedure, and/or a respective receive-side beam sweeping procedure. Alternatively, or additionally, the first UE 602 and/or the second UE 604 may generate signal metric(s) based at least in part on the ongoing HD sidelink communications, such as by generating an RSRP signal metric based at least in part on a (respective) HD sidelink transmission that includes a multiplexed DMRS, or an RSSI signal metric based at least in part on an HD sidelink transmission that lacks the multiplexed DMRS. The first UE 602 and/or the second UE 604 may independently select (e.g., from one another) transmit beam(s) and/or receive beam(s) to include in beam sweeping procedures. For instance, the first UE 602 and/or the second UE 604 may select transmit beams and/or receive beams using signal metrics that are generated as part of establishing an HD sidelink.

As shown by reference number 715-1, the first UE 602 may select a first set of candidate FD beam pairs, as described with regard to reference number 625 of FIG. 6. As shown by reference number 715-2, the second UE 604 may select, in parallel with the first UE 602, a second set of candidate FD beam pairs, in a similar manner as described with regard to reference number 625 of FIG. 6. In some aspects, the first UE 602 and/or the second UE 604 may select the candidate FD beam pairs based at least in part on self-interference metrics, signal metrics, and/or quality metrics (e.g., joint quality metrics).

As shown by reference number 720, the first UE 602 may transmit an indication of the first candidate FD beam pairs based at least in part on using an HD sidelink communication. For example, and as described with regard to reference number 630 of FIG. 6, the first UE 602 may transmit the indication in a sidelink control message. As described above, the first UE 602 may indicate the candidate FD beam pairs by indicating a respective beam index. Alternatively or additionally, the first UE 602 may indicate, for each candidate FD beam pair, a respective rank, a respective signal metric, a respective self-interference metric, and/or a respective quality metric that indicates a performance quality of each candidate FD beam pair. In some aspects, the second UE 604 may transmit a second indication of the second set of candidate FD beam pairs at a contemporaneous time as the first UE 602. Accordingly, and as described above, a UE ID may break the deadlock by indicating which UE has priority.

As shown by reference number 725, the second UE 604 may select one or more FD beam pairs to include in an FD beam set as described with regard to reference number 640 of FIG. 6. To illustrate, the second UE 604 may select one or more FD beam pairs associated with the FD beam set based at least in part on the self-interference metric(s) and/or joint quality metric(s). Alternatively, or additionally, the second UE 604 may evaluate the first set of candidate FD beam pairs and/or the second set of candidate FD beam pairs based at least in part on self-interference metrics, signal metrics, and/or quality metrics that are generated based at least in part on using HD communications as described above. The second UE 604 may select a respective FD beam set and/or respective FD beam pairs for each sidelink communication channel or a common FD beam set for multiple sidelink communication channels. In some aspects, the second UE 604 may select an FD beam set and/or FD beam pairs included in the FD beam set based at least in part on mitigating self-interference at both the first UE 602 and the second UE 604 (e.g., by jointly optimizing a first signal metric and/or first self-interference metric at the first UE 602 and a second signal metric and/or second self-interference metric at the second UE 604). The second UE 604 may select FD beam pairs that are included in an FD beam set based at least in part on identifying FD beam pairs that satisfy a quality threshold (e.g., an SINR) for both UEs. The second UE 604 may select the FD beam pairs included in an FD beam set based at least in part on ranking the candidate FD beam pairs as described above.

As shown by reference number 730, the second UE 604 may transmit, and the first UE 602 may receive, an indication of the FD beam set and/or FD beam pairs that are included in the FD beam set, as described with regard to reference number 645 of FIG. 6. In some aspects, the indication may specify at least part of the FD beam set, such as a first FD beam pair associated with the first UE 602 and a second FD beam pair associated with the second UE 604. Alternatively, or additionally, the indication of the FD beam set may specify more than two FD beam pairs Jointly selecting at least one FD beam pair based at least in part on self-interference measurements associated with ongoing HD communications may enable a UE to identify FD beam pair(s) that reduce self-interference at the UE. Coordinating selection of an FD beam set may improve FD sidelink performance at UEs communicating over the sidelink using an FD mode. Improving FD sidelink performance may reduce recovery errors, reduce sidelink data transfer latencies, and/or improve sidelink bandwidth.

As indicated above, FIG. 7 is provided as an example. Other examples may differ from what is described with regard to FIG. 7.

FIG. 8 is a diagram illustrating an example 800 of beam sweeping procedures, in accordance with the present disclosure. In some aspects, a UE (e.g., the UE 120) may configure an antenna array to form a transmit beam based at least in part on modifying a respective amplitude and/or respective phase of a signal transmitted by a respective antenna in the antenna array such that the output signals constructively and/or destructively combine together to form a transmit beam that propagates in a particular direction. Alternatively, or additionally, the UE may apply a respective weight to a respective received signal by a respective antenna in an antenna array to configure a main lobe direction and/or width of a receive beam. In some aspects, a UE (e.g., the UE 120) may measure self-interference associated with one or more FD transmissions based at least in part on one or more beam sweeping procedures that iterate through different receive beams and/or transmit beams.

To illustrate, and as described with regard to FIGS. 6 and 7, a UE may measure self-interference based at least in part on a receive-side beam sweeping procedure 802 and/or a transmit-side beam sweeping procedure 804 that iterates through combinations of candidate FD beam pairs based at least in part on alternating between one or more receive beams and/or one or more transmit beams. For example, and as shown by FIG. 8, a first candidate FD beam pair 806 may be based at least in part on a first transmit beam 808 and a first receive beam 810. In some aspects, the UE may generate a first transmission (e.g., a reference signal and/or an HD communication) based at least in part on the first transmit beam 808. The first transmission may generate first self-interference 812 at a receiver that is configured based at least in part on the first receive beam 810. Accordingly, the UE may generate a self-interference metric to characterize the first self-interference, as further described with regard to FIGS. 9A, 9B, and/or 9C. As part of the receive-side beam sweeping procedure 802, the UE may reconfigure a receiver and/or receive antenna from the first receive beam 810 to a second receive beam 814. As shown by FIG. 8, the UE may evaluate a second FD beam pair 816 that is based at least in part on the first transmit beam 808 and the second receive beam 814. For example, the UE may generate a second self-interference metric that characterizes second self-interference 818 that is associated with a second transmission that is based at least in part on the first transmit beam 808 and the second receive beam 814. Accordingly, as part of performing the receive-side beam sweeping procedure 802, a UE may switch between the first receive beam 810 and the second receive beam 814.

Alternatively, or additionally, as part of performing the transmit-side beam sweeping procedure 804, a UE may iteratively change between the first transmit beam 808 and a second transmit beam 820. For example, the UE may evaluate the second beam pair 816 based at least in part on generating a self-interference metric as described above, and then iteratively change from the first transmit beam 808 to the second transmit beam 820 to form a third candidate FD beam pair 822. That is, the third candidate FD beam pair 822 may be based at least in part on the second transmit beam 820 and the second receive beam 814. To evaluate the third candidate FD beam pair 822, the UE may generate a third self-interference metric that characterizes third self-interference 824, as described below with regard to FIGS. 9A, 9B, and/or 9C. The third self-interference may be associated with a third transmission that is based at least in part on the second transmit beam 820 and the second receive beam 814. Accordingly, as part of performing the transmit-side beam sweeping procedure 804, a UE may switch between the first transmit beam 808 and the second transmit beam 820. A fourth candidate FD beam pair 826 may be based at least in part on the second transmit beam 820 and the first receive beam 810. As described above, the UE may evaluate the fourth candidate FD beam pair 826 based at least in part on fourth self-interference 828 that may be characterized by one or more self-interference metrics.

The order in which a UE may iterate through transmit beams and/or receive beams may vary from that described with regard to the example 800. Alternatively, or additionally, a UE may evaluate a candidate FD beam pair based at least in part on one or more other signal metrics, such as an external interference metric (e.g., a zero power CSI-RS measurement).

A beam-sweeping procedure may enable a UE to generate one or more self-interference metrics that indicate a quality of one or more FD beam pairs. In some aspects, the UE may generate the self-interference metrics based at least in part on (current) HD communications with another UE. The UE may select an FD beam pair and/or a candidate FD beam pair based at least in part on the self-interference metrics, such as by selecting an FD beam pair that has reduced self-interference relative to other FD beam pairs, and improve a signal quality of FD sidelink communications by using the selected FD beam pair to transmit and/or receive the FD sidelink communications and/or an FD sidelink. Improving a signal quality associated with FD sidelink communications and/or FD sidelink may reduce recovery errors, reduce sidelink data transfer latencies, and/or improve sidelink bandwidth.

As indicated above, FIG. 8 is provided as an example. Other examples may differ from what is described with regard to FIG. 8.

FIGS. 9A, 9B, and 9C are diagrams illustrating a first example 900, a second example 902, and a third example 904 of self-interference measurements, in accordance with the present disclosure.

The first example 900 shown by FIG. 9A includes transmissions between a first UE (e.g., a UE 120) and a second UE (e.g., another UE 120). The first UE may transmit a first transmission 906 based at least in part on a first transmit frequency band 908, and the second UE may receive the first transmission 906 based at least in part on a first receive frequency band 910. The first transmit frequency band 908 and/or the first receive frequency band 910 may be a single and/or same frequency band that is based at least in part on a configured band that is allocated to transmissions by the first UE and/or allocated to transmissions received by the second UE. To illustrate, the first transmit frequency band 908 and/or the first receive frequency band 910 may span an entirety of the configured band or a portion of the configured band, such as a sub-band. Alternatively, or additionally, the second UE may transmit a second transmission 912 based at least in part on a second transmit frequency band 914, and the first UE may receive the second transmission 912 based at least in part on a second receive frequency band 916. The first UE may transmit the first transmission 906 based at least in part on a first transmit beam, and the second UE may receive the first transmission 906 based at least in part on a first receive beam. Alternatively, or additionally, the second UE may transmit the second transmission 912 based at least in part on a second transmit beam, and the first UE may receive the second transmission 912 based at least in part on a second receive beam.

In some aspects, the first transmission 906 may result in self-interference 918 to a signal received within the second receive frequency band 916. Alternatively, or additionally, the second transmission may result in self-interference 920 within the first receive frequency band 910. Accordingly, the first UE may generate a self-interference metric (e.g., RSSI of the interference) based at least in part on a measurement band 922, which may span a portion and/or all of the second receive frequency band 916. In some aspects, the first UE may generate the self-interference metric during a time span in which the first UE is transmitting the first transmission 906 and the second UE is not transmitting the second transmission 912. For example, the first transmission 906 may be an HD sidelink communication. Alternatively, or additionally, the first UE may generate a signal metric (e.g., an RSRP metric) during a second time span in which the second UE is transmitting the second transmission 912, and calculate a joint quality metric (e.g., SINR) based at least in part on the self-interference metric and the signal metric. While described as the first UE generating the self-interference metric and/or the signal metric, the second UE may alternatively, or additionally, generate a self-interference metric and/or signal metric based at least in part on a measurement band 924 that spans a portion and/or all of the first receive frequency band 910. To illustrate, the second UE may generate the self-interference metric during a time span in which the second UE is transmitting the second transmission 912 and the first UE is not transmitting the first transmission 906 (e.g., an HD sidelink communication), and generate the signal metric during a second time span in which the second UE is not transmitting the second transmission 912 and the first UE is transmitting the first transmission 906.

In some aspects, the first UE and the second UE may select, for a transmit frequency band and/or a receive frequency band associated with an HD sidelink, a configuration that is based at least in part on a target FD operating mode. For example, the first UE and the second UE may select one or more sub-bands associated with SBFD communications. As another example, for IBFD communications, the first UE and the second UE may configure the HD communications to use overlapping (e.g., partially or fully) transmission bands (e.g., the first transmit frequency band 908 overlapping with the second transmit frequency band 914 and/or the first receive frequency band 910 being overlapping with the second receive frequency band 916). In some aspects, the first UE and the second UE may select a configuration for the transmit frequency band(s) and/or receive frequency band(s) based at least in part on communicating sensing results (e.g., Mode 2 sensing results). That is, the first UE and the second UE may each generate sensing results, may transmit the respective sensing results to the other UE, and may coordinate selection of one or more sidelink resources that each UE senses as being unoccupied. The coordinated selection of sidelink resource(s) may be used for generating self-interference metrics based at least in part on ongoing HD communications and/or for FD communications.

Generating a self-interference metric based at least in part on a receive channel bandwidth as shown by FIG. 9A may characterize (e.g., within an accuracy threshold) an amount of self-interference that may be observed by a UE during FD transmissions based at least in part on a particular FD beam pair at the UE. In some aspects, the UE may identify a candidate FD beam pair based at least in part on an amount of self-interference that is observed within a receive frequency band and/or a quality metric (e.g., SINR) associated with the candidate FD beam pair using a self-interference metric (e.g., RSSI) and a signal metric (e.g., RSRP). For example, the UE may select a first FD beam pair as a candidate FD beam pair instead of a second FD beam pair based at least in part on the first FD beam pair having a higher quality metric relative to the second FD beam pair.

The second example 902, as shown by FIG. 9B, includes the first transmission 906 (e.g., from the first UE to the second UE) that is based at least in part on the first transmit frequency band 908, the first receive frequency band 910, the first transmit beam, and/or the first receive beam. The second example 902 also includes the second transmission 912 (e.g., from the second UE to the first UE) that is based at least in part on the second transmit frequency band 914, the second receive frequency band 916, the second transmit beam, and/or the second receive beam. As described above, the first transmission 906 and the second transmission 912 may be HD communications that occur at different times and/or are non-overlapping in the time domain.

In some aspects, the first transmission 906 may result in self-interference 926 to a signal received within the first transmit frequency band 908. Accordingly, the first UE may generate a self-interference metric based at least in part on a measurement band 928 that spans a portion and/or all of the first transmit frequency band 908 and the second receive beam used by the first UE to receive the second transmission 912. To illustrate, the first UE may generate the first transmission 906 based at least in part on configuring a first antenna array and/or first antenna panel to transmit the first transmission 906 based at least in part on the first transmit beam. The first UE may measure self-interference in at least a portion of the measurement band 928 by configuring a second antenna array and/or second antenna panel based at least in part on the second receive beam used to receive the second transmission 912 from the second UE.

The second UE may transmit an out-of-band signal 930 (e.g., to a different device than the first UE and/or to the first UE) that the first UE may observe and/or receive in the measurement band 928. In some aspects, the first UE may observe the out-of-band signal 930 as external interference (e.g., interference that is not generated by the first UE). Alternatively, or additionally, the first UE may use the out-of-band signal 930 to generate a signal metric, such as an RSRP metric and/or and RSSI metric. The out-of-band signal 930 may enable the first UE to generate a signal metric and a self-interference metric in a same and/or overlapping band, and potentially identify a frequency band with improved performance (e.g., higher SINR) for FD communications relative to not having the out-of-band signal for measurement in a same/or overlapping band. Accordingly, the first UE may generate an additional quality metric (e.g., SINR) based at least in part on the out-of-band signal 930, the self-interference metric, the measurement band 928, and the second antenna array configured based at least in part on the second receive beam.

Alternatively, or additionally, the second transmission 912 may result in self-interference 932 to a signal received within the second transmit frequency band 914 associated with the second UE. Accordingly, the second UE may generate a self-interference metric based at least in part on a measurement band 934 that spans a portion and/or all of the second transmit frequency band 914. For instance, and using a similar process as the first UE, the second UE may configure a first antenna array to transmit the second transmission 912 based at least in part on a second transmit beam, and configure a second antenna array based at least in part on the first receive beam (e.g., used to receive the first transmission 906). The second UE may generate a self-interference metric based at least in part on the measurement band 934, the second transmission 912 transmitted via the first antenna array, and/or interference received based at least in part on the second antenna array. In some aspects, the first UE may transmit an out-of-band signal 936 (e.g., to a different device than the second UE, or to the second UE) that the second UE may observe and/or receive in the measurement band 934. In a manner similar as described above, the out-of-band signal 936 may enable the second UE to generate a signal metric and a self-interference metric in a same and/or overlapping band, and potentially identify a frequency band with improved performance (e.g., higher SINR) for FD communications relative to not having the out-of-band signal 936 for measurement in a same/overlapping band. Accordingly, the second UE may generate an additional interference metric and/or signal metric based at least in part on the out-of-band signal 930, the measurement band 934, and the second antenna array configured based at least in part on the first receive beam.

Generating a self-interference metric based at least in part on a transmission band (e.g., the measurement band 928 and/or the measurement band 934) may enable a UE to measure a worst-case self-interference metric (e.g., fully-overlapping IBFD and/or in-band self-interference) and identify an FD beam pair that mitigates the self-interference better, relative to other FD beam pairs. Accordingly, selecting an FD beam pair (and/or a candidate FD beam pair) based at least in part on a worst-case self-interference metric may result in selecting an FD beam pair that mitigates self-interference in other FD modes, such as an SBFD and/or a partial overlapping IBFD mode. This may be because self-interference energy from a transmit band to a receive band may decrease as the spacing between the bands increases due to band-limited filtering of the transmitted waveform.

The third example 904, as shown by FIG. 9C, includes the first transmission 906 (e.g., from the first UE to the second UE) that is based at least in part on the first transmit frequency band 908, the first receive frequency band 910, the first transmit beam, and/or the first receive beam. The third example 904 also includes the second transmission 912 (e.g., from the second UE to the first UE) that is based at least in part on the second transmit frequency band 914, the second receive frequency band 916, the second transmit beam, and/or the second receive beam. As described above, the first transmission 906 and the second transmission 912 may be HD communications that occur at different times and/or are non-overlapping in the time domain.

In some aspects, the first transmission 906 may result in self-interference 938 to a signal received in a frequency band and/or a portion of a frequency band (e.g., a sub-band) that is located outside of a transmit frequency band and/or a receive frequency band associated with HD communications. Alternatively, or additionally, a UE may determine to analyze one or more frequency bands and/or sub-bands to identify frequency bands and/or sub-bands that may improve FD sidelink communications relative to other frequency locations. For instance, the UE may identify a particular sub-band that observes less self-interference relative to other sub-bands based at least in part on a particular FD beam pair, and subsequently select the particular sub-band and particular FD beam pair for FD sidelink communications. Accordingly, the first UE may generate a self-interference metric based at least in part on a measurement band 940 that spans a frequency band and/or sub-band that is at a different frequency location than a transmit frequency band and/or receive frequency band used for an HD sidelink. To illustrate, the first UE may generate the first transmission 906 based at least in part on the first transmit frequency band 908 and the first transmit beam (e.g., by configuring a first antenna array and/or antenna panel based at least in part on the first transmit beam). The first UE may generate a self-interference metric based at least in part on at least a portion of the measurement band 940. For example, the first UE may configure a second antenna array and/or second antenna panel based at least in part on the second receive beam used to receive the second transmission 912 from the second UE and/or tune a receiver to the measurement band 940.

Alternatively, or additionally, the second UE may transmit a signal 942 based at least in part on a frequency that is located outside of a transmit frequency band and/or receive frequency band used for an HD sidelink (e.g., the measurement band 940). For example, the first UE may indicate an intent to generate a self-interference metric and/or a signal metric based at least in part on the measurement band 940, and the second UE may transmit the signal 942 at a frequency that is located within the measurement band 940. For instance, the second UE may transmit a reference signal (e.g., a CSI-RS) based at least in part on using one or more air interface resources that are outside of the HD sidelink channel bandwidth and/or are within the measurement band 940. The first UE may generate a signal metric (e.g., an RSRP metric and/or and RSSI metric) based at least in part on the reference signal. In some aspects, the first UE may generate a quality metric associated with an FD beam pair based at least in part on a self-interference metric (e.g., associated with the measurement band 940 and the first transmission 906) and a signal metric (e.g., associated with the signal 942 and the measurement band 940), such as an SINR metric.

In some aspects, the second UE may generate a self-interference metric based at least in part on observed self-interference 944 in a frequency band and/or sub-band that is located outside of a transmit frequency band and/or receive frequency band associated with an HD sidelink and/or an HD sidelink channel. For instance, the second UE may generate a self-interference metric based at least in part on the second transmission 912 and a measurement band 946 that is located outside of the transmit frequency band and/or the receive frequency band. In some aspects, the first UE may transmit a signal 948 within the measurement band 946, such as a reference signal as described above, and the second UE may generate a signal metric (e.g., an RSRP metric and/or and RSSI metric) based at least in part on the signal 948. In some aspects, the second UE may generate a quality metric associated with an FD beam pair based at least in part on a self-interference metric (e.g., associated with the measurement band 940 and the first transmission 906) and a signal metric (e.g., associated with the signal 942 and the measurement band 940), such as an SINR metric.

Measuring in a frequency band and/or sub band that is outside of a transmit frequency band and/or a receive frequency band associated with an HD sidelink may enable a UE to identify frequency resources that may observe less self-interference in FD sidelink communications. By coordinating the analysis of the frequency band with a second UE, the first UE can generate a joint quality metric that characterizes self-interference observed by the first UE when using a particular FD beam pair during FD sidelink communications and/or how the self-interference may degrade the FD sidelink communications (and/or vice versa, by the second UE).

As indicated above, FIGS. 9A, 9B, and 9C are provided as examples. Other examples may differ from what is described with regard to FIGS. 9A, 9B, and 9C. To illustrate, the first transmit frequency band 908 and the second transmit frequency band 914 are shown by FIG. 9A as being non-overlapping transmit frequency bands. Other examples may include the first transmit frequency band 908 and the second transmit frequency band 914 being partially overlapping and/or fully-overlapping in the frequency domain. Alternatively or additionally, fully-overlapping frequency bands may result in a first self-interference metric associated with measurement in a transmit frequency band being the same as a second self-interference metric for measurement in an (overlapping) receive frequency band.

FIG. 10 is a diagram illustrating an example process 1000 performed, for example, by a UE, in accordance with the present disclosure. Example process 1000 is an example where the UE (e.g., UE 120) performs operations associated with FD beam selection for sidelink communications.

As shown in FIG. 10, in some aspects, process 1000 may include transmitting, using a sidelink with a second UE, a first indication of one or more candidate FD beam pairs selected by the first UE for an FD sidelink transmission (block 1010). For example, the UE (e.g., using transmission component 1204 and/or communication manager 1206, depicted in FIG. 12) may transmit, using a sidelink with a second UE, a first indication of one or more candidate FD beam pairs selected by the first UE for an FD sidelink transmission, as described above.

As further shown in FIG. 10, in some aspects, process 1000 may include receiving, using the sidelink, a second indication that specifies at least part of an FD beam set that includes a first FD beam pair associated with the first UE and a second FD beam pair associated with the second UE, the FD beam set being based at least in part on the one or more candidate FD beam pairs (block 1020). For example, the UE (e.g., using reception component 1202 and/or communication manager 1206, depicted in FIG. 12) may receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs, as described above.

As further shown in FIG. 10, in some aspects, process 1000 may include communicating with the second UE using the sidelink based at least in part on the FD beam set and the FD sidelink transmission (block 1030). For example, the UE (e.g., using reception component 1202, transmission component 1204, and/or communication manager 1206, depicted in FIG. 12) may communicate with the second UE using the sidelink based at least in part on the FD beam set and the FD sidelink transmission, as described above.

Process 1000 may include additional aspects, such as any single aspect or any combination of aspects described below and/or in connection with one or more other processes described elsewhere herein.

In a first aspect, the second indication specifies the first FD beam pair, and the first FD beam pair includes a first FD sidelink transmit beam associated with the first UE, and a first FD sidelink receive beam associated with the first UE.

In a second aspect, the second indication specifies the second FD beam pair, and the second FD beam pair includes a second FD sidelink transmit beam associated with the second UE, and a second FD sidelink receive beam associated with the second UE.

In a third aspect, process 1000 includes transmitting, using the sidelink, FD sidelink capability information associated with the first UE.

In a fourth aspect, transmitting the FD sidelink capability information includes transmitting the FD sidelink capability information in sidelink control information.

In a fifth aspect, transmitting the FD sidelink capability information includes transmitting the FD sidelink capability information based at least in part on a sidelink discovery process.

In a sixth aspect, transmitting the FD sidelink capability information includes at least one of broadcasting the FD sidelink capability information, transmitting the FD sidelink capability information in a multicast message, or transmitting the FD sidelink capability information in a unicast message.

In a seventh aspect, the FD sidelink capability information indicates at least one of at least one supported FD mode, at least one supported link type, a first maximum number of supported FD beams associated with the at least one supported link type, a second maximum number of directional ports, or a channel type.

In an eighth aspect, transmitting the FD sidelink capability information includes transmitting the FD sidelink capability information during an RRC setup procedure associated with the sidelink.

In a ninth aspect, transmitting the FD sidelink capability information includes transmitting the FD sidelink capability information after establishing an RRC connected state that is associated with the sidelink.

In a tenth aspect, the FD sidelink capability information associated with the first UE is first FD sidelink capability information, and process 1000 includes transmitting, using the sidelink, a request for second FD sidelink capability information that is associated with the second UE.

In an eleventh aspect, process 1000 includes receiving, using the sidelink and from the second UE, a request for the FD sidelink capability information, and transmitting the FD sidelink capability information is based at least in part on receiving the request.

In a twelfth aspect, process 1000 includes receiving, using the sidelink, FD sidelink capability information associated with the second UE.

In a thirteenth aspect, process 1000 includes identifying, using the FD sidelink capability information, a common FD sidelink capability that is supported by the second UE and the first UE, and communicating using the sidelink based at least in part on the FD beam set and the FD sidelink transmission further includes communicating using the sidelink based at least in part on the common FD sidelink capability.

In a fourteenth aspect, process 1000 includes communicating, with the second UE and prior to transmitting the one or more candidate FD beam pairs, using an HD sidelink transmission based at least in part on an HD link beam pair.

In a fifteenth aspect, communicating using the HD sidelink transmission includes receiving the HD sidelink transmission from the second UE, and process 1000 includes generating a signal metric based at least in part on the HD sidelink transmission.

In a sixteenth aspect, generating the signal metric includes generating the signal metric based at least in part on using at least a portion of the HD sidelink transmission that is within a configured sidelink receive channel bandwidth.

In a seventeenth aspect, process 1000 includes receiving, using the sidelink, reference signal configuration information, and receiving a reference signal based at least in part on the reference signal configuration information, and generating the signal metric is based at least in part on the reference signal.

In an eighteenth aspect, the reference signal configuration information indicates that at least a portion of the reference signal is outside of a configured bandwidth, and generating the signal metric is based at least in part on the at least a portion of the reference signal that is outside of the configured bandwidth.

In a nineteenth aspect, process 1000 includes generating one or more interference metrics based at least in part on one or more HD sidelink transmissions and a transmit-side beam sweeping procedure; and selecting the one or more candidate FD beam pairs based at least in part on the one or more interference metrics.

In a twentieth aspect, the one or more interference metrics include at least one of a self-interference metric, or an external interference metric.

In a twenty-first aspect, process 1000 includes performing a receive-side beam sweeping procedure that iteratively changes a beam pairing of an HD transmit beam and a respective receive beam in a set of receive beams, and generating the one or more interference metrics includes generating a respective interference metric of the one or more interference metrics based at least in part on the beam pairing of the HD transmit beam and the respective receive beam.

In a twenty-second aspect, process 1000 includes performing a transmit-side beam sweeping procedure that iteratively changes a beam pairing of a receive beam with a respective transmit beam included in a set of transmit beams, and generating the one or more interference metrics includes generating a respective interference metric of the one or more interference metrics based at least in part on the beam pairing of the receive beam and the respective transmit beam.

In a twenty-third aspect, the set of transmit beams is a first set of transmit beans, and the receive beam is included in a second set of receive beams, and process 1000 includes performing a receive-side beam sweeping procedure that iteratively changes the receive beam included in the beam pairing to a different receive beam included in the second set of receive beams, and generating the one or more interference metrics includes generating the respective interference metric of the one or more interference metrics based at least in part on the beam pairing including the different receive beam.

In a twenty-fourth aspect, process 1000 includes reserving at least one sidelink air interface resource for a data transmission based at least in part on at least one of the transmit-side beam sweeping procedure or the receive-side beam sweeping procedure, transmitting a signal based at least in part on the at least one sidelink air interface resource, and generating a self-interference metric based at least in part on transmitting the signal.

In a twenty-fifth aspect, process 1000 includes transmitting, using the sidelink, a request for a preferred beam report, transmitting, using the sidelink, one or more reference signals based at least in part on using one or more transmit beams, and receiving, using the sidelink, the preferred beam report.

In a twenty-sixth aspect, the one or more reference signals include one or more SL-SSBs.

In a twenty-seventh aspect, the preferred beam report specifies at least one of a first preferred transmit beam that is based at least in part on the one or more transmit beams, or a second preferred transmit beam that is associated with the second UE.

In a twenty-eighth aspect, the one or more candidate FD beam pairs includes a first set of candidate FD beam pairs that are selected by the first UE, and process 1000 includes receiving, using the sidelink and prior to transmitting the first indication, a self-interference measurement report that indicates a second set of candidate FD beam pairs that are selected by the second UE, and the first set of candidate FD beam pairs is based at least in part on the second set of candidate FD beam pairs.

In a twenty-ninth aspect, transmitting the first indication of the one or more candidate FD beam pairs includes transmitting the first indication using a transmission order that is based at least in part on a UE ID associated with the first UE.

In a thirtieth aspect, process 1000 includes generating a self-interference metric based at least in part on at least a portion of a sidelink receive channel bandwidth associated with an HD transmission, and selecting the one or more FD beam pairs based at least in part on the self-interference metric.

In a thirty-first aspect, process 1000 includes generating a self-interference metric based at least in part on at least a portion of a sidelink transmit channel bandwidth associated with an HD transmission, and selecting the one or more FD beam pairs based at least in part on the self-interference metric.

In a thirty-second aspect, process 1000 includes generating a self-interference metric based at least in part on using at least a portion of a frequency bandwidth that is outside of a sidelink receive channel bandwidth and a sidelink transmit channel bandwidth, and selecting the one or more FD beam pairs based at least in part on the self-interference metric.

In a thirty-third aspect, process 1000 includes calculating, for each candidate FD beam pair of the one or more candidate FD beam pairs, a respective quality metric based at least in part on at least one of a signal metric or an interference metric, and determining a rank order of the one or more candidate FD beam pairs based at least in part on the respective quality metric of each candidate FD beam pair, and the first indication of the one or more FD beam pairs specifies the rank order.

In a thirty-fourth aspect, the one or more candidate FD beam pairs are a subset of candidate FD beam pairs that are included in a set of candidate FD beam pairs.

In a thirty-fifth aspect, the respective quality metric includes an SINR metric.

In a thirty-sixth aspect, transmitting the first indication of the one or more candidate FD beam pairs includes transmitting the first indication in a sidelink control message.

In a thirty-seventh aspect, the first indication specifies, for each beam included in a candidate FD beam pair of the one or more candidate FD beam pairs, a respective beam index.

In a thirty-eighth aspect, the respective beam index includes at least one of an SSB beam index, or a CSI-RS beam index.

In a thirty-ninth aspect, the first indication specifies, for each candidate FD beam pair of the one or more candidate FD beam pairs, a respective signal metric that indicates a performance quality of the FD beam pair.

In a fortieth aspect, the first indication specifies, for each candidate FD beam pair, a joint metric that is based at least in part on the respective signal metric and a respective interference metric.

In a forty-first aspect, process 1000 includes omitting, from the first indication, a respective signal metric associated with each candidate FD beam pair to indicate that the one or more candidate FD beam pairs have commensurate performance quality within a threshold value.

In a forty-second aspect, receiving the second indication includes receiving the second indication in a PSCCH.

In a forty-third aspect, the second indication specifies that the FD beam set is associated with at least two sidelink channels.

In a forty-fourth aspect, the FD beam set is a first FD beam set, the second indication specifies that the first FD beam set is associated with a first sidelink channel, and the second indication specifies a second FD beam set that is associated with a second sidelink channel.

In a forty-fifth aspect, process 1000 includes switching from communicating with the second UE based at least in part on an HD sidelink transmission to communicating with the second UE based at least in part on the FD sidelink transmission.

In a forty-sixth aspect, switching from communicating with the second UE based at least in part on the HD sidelink transmission to communicating with the second UE based at least in part on the FD sidelink transmission includes switching without performing channel sensing after receiving the second indication.

In a forty-seventh aspect, switching from communicating with the second UE based at least in part on the HD sidelink transmission to communicating with the second UE based at least in part on the FD sidelink transmission includes switching to communicating with the second UE based at least in part on the FD sidelink transmission and a pre-configured FD synchronization configuration.

In a forty-eighth aspect, switching from communicating with the second UE based at least in part on the HD sidelink transmission to communicating with the second UE based at least in part on the FD sidelink transmission includes switching after receiving the second indication and performing channel sensing.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with the present disclosure. Example process 1100 is an example where the UE (e.g., UE 120) performs operations associated with FD beam selection for sidelink communications.

As shown in FIG. 11, in some aspects, process 1100 may include receiving, using a sidelink with a first UE, a first indication of one or more candidate FD beam pairs selected by the first UE for an FD sidelink transmission (block 1110). For example, the UE (e.g., using reception component 1202 and/or communication manager 1206, depicted in FIG. 12) may receive, using a sidelink with a first UE, a first indication of one or more candidate FD beam pairs selected by the first UE for an FD sidelink transmission, as described above.

As further shown in FIG. 11, in some aspects, process 1100 may include transmitting, using the sidelink, a second indication that specifies at least part of an FD beam set that includes a first FD beam pair associated with the first UE and a second FD beam pair associated with the second UE, the FD beam set being based at least in part on the one or more candidate FD beam pairs (block 1120). For example, the UE (e.g., using transmission component 1204 and/or communication manager 1206, depicted in FIG. 12) may transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs, as described above.

As further shown in FIG. 11, in some aspects, process 1100 may include communicating with the first UE using the sidelink based at least in part on the FD beam set and the FD sidelink transmission (block 1130). For example, the UE (e.g., using reception component 1202, transmission component 1204, and/or communication manager 1206, depicted in FIG. 12) may communicate with the first UE using the sidelink based at least in part on the FD beam set and the FD sidelink transmission, as described above.

Process 1100 may include additional aspects, such as any single aspect or any combination of aspects described below and/or in connection with one or more other processes described elsewhere herein.

In a first aspect, the second indication specifies the first FD beam pair, the first FD beam pair includes a first FD sidelink transmit beam associated with the first UE, and a first FD sidelink receive beam associated with the first UE.

In a second aspect, the second indication specifies the second FD beam pair, and the second FD beam pair includes a second FD sidelink transmit beam associated with the second UE, and a second FD sidelink receive beam associated with the second UE.

In a third aspect, process 1100 includes receiving, using the sidelink, FD sidelink capability information associated with the first UE.

In a fourth aspect, process 1100 includes transmitting, using the sidelink, FD sidelink capability information associated with the second UE.

In a fifth aspect, process 1100 includes receiving, using the sidelink, a request for the FD sidelink capability information that is associated with the second UE, and transmitting the FD sidelink capability information is based at least in part on receiving the request.

In a sixth aspect, process 1100 includes communicating, prior to receiving the one or more candidate FD beam pairs, with the first UE using an HD sidelink transmission and based at least in part on an HD sidelink beam pair.

In a seventh aspect, communicating with the first UE using the HD sidelink transmission includes receiving the HD sidelink transmission from the first UE, and process 1100 includes generating a signal metric based at least in part on the HD sidelink transmission.

In an eighth aspect, the one or more candidate FD beam pairs is a first set of candidate FD beam pairs, and process 1100 includes generating one or more interference metrics based at least in part on one or more HD sidelink transmissions, and selecting a second set of candidate FD beam pairs based at least in part on the one or more interference metrics. In some aspects, the eighth aspect may include selecting an FD beam set based at least in part on the first set of candidate FD beam pairs and the second set of candidate FD beam pairs.

In a ninth aspect, the one or more interference metrics include at least one of a self-interference metric, or an external interference metric.

In a tenth aspect, the second set of candidate FD beam pairs is based at least in part on the first set of candidate FD beam pairs.

In an eleventh aspect, the second set of candidate FD beam pairs is a subset of the first set of candidate FD beam pairs.

In a twelfth aspect, selecting the second set of candidate FD beam pairs includes selecting the second set of candidate FD beam pairs independent of the first set of candidate FD beam pairs.

In a thirteenth aspect, process 1100 includes calculating, for each candidate FD beam pair of the one or more candidate FD beam pairs, a respective quality metric, and selecting the FD beam set at least in part on the respective quality metric of each candidate FD beam pair of the one or more candidate FD beam pairs.

In a fourteenth aspect, the respective quality metric includes an SINR metric.

In a fifteenth aspect, the FD beam set is one of multiple FD beam sets, selecting the FD beam set includes selecting the multiple FD beam sets, and the second indication specifies the multiple FD beam sets.

In a sixteenth aspect, selecting the FD beam set includes selecting the FD beam set based at least in part on mitigating self-interference at the first UE and the second UE.

In a seventeenth aspect, mitigating the self-interference at the first UE and the second UE includes selecting an FD beam set based at least in part on jointly optimizing a first signal-and-interference metric associated with the first UE and a second signal-and-interference metric at the second UE.

In an eighteenth aspect, selecting the FD beam set is based at least in part on a quality threshold.

In a nineteenth aspect, process 1100 includes receiving, using the sidelink and prior to transmission of the first indication, a request for a preferred beam report, receiving one or more reference signals based at least in part on the one or more candidate FD beam pairs, generating one or more signal metrics based at least in part on the one or more candidate FD beam pairs, generating the preferred beam report based at least in part on the one or more signal metrics, and transmitting, using the sidelink, the preferred beam report.

In a twentieth aspect, the one or more reference signals include at least one of one or more SL-SSBs, or one or more CSI-RSs.

In a twenty-first aspect, the one or more candidate FD beam pairs include a first set of candidate FD beam pairs that are selected by the first UE, and process 1100 includes transmitting, using the sidelink and prior to transmitting the first indication, a self-interference measurement report that indicates a second set of candidate FD beam pairs that are selected by the second UE, and the first set of candidate FD beam pairs is based at least in part on the second set of candidate FD beam pairs.

In a twenty-second aspect, receiving the first indication of the one or more candidate FD beam pairs includes receiving the first indication using a transmission order that is based at least in part on a UE ID associated with the second UE.

In a twenty-third aspect, the one or more candidate FD beam pairs include a first set of candidate FD beam pairs that are selected by the first UE, and process 1100 includes generating a self-interference metric based at least in part on using at least a portion of a sidelink receive channel bandwidth associated with an HD transmission, and selecting a second set of one or more candidate FD beam pairs based at least in part on the self-interference metric. In some aspects, the twenty-third aspect may include selecting an FD beam set based at least in part on the first set of candidate FD beam pairs and the second set of candidate FD beam pairs.

In a twenty-fourth aspect, the one or more candidate FD beam pairs include a first set of candidate FD beam pairs that are selected by the first UE, and process 1100 includes generating a self-interference metric based at least in part on at least a portion of a sidelink transmit channel bandwidth associated with an HD transmission, and selecting a second set of one or more candidate FD beam pairs based at least in part on the self-interference metric. In some aspects, the twenty-fourth aspect may include selecting an FD beam set based at least in part on the first set of candidate FD beam pairs and the second set of candidate FD beam pairs.

In a twenty-fifth aspect, the one or more candidate FD beam pairs include a first set of candidate FD beam pairs that are selected by the first UE, and process 1100 includes generating a self-interference metric based at least in part on using at least a portion of a frequency bandwidth that is outside of a sidelink receive channel bandwidth and a sidelink transmit channel bandwidth, and selecting a second set of one or more candidate FD beam pairs based at least in part on the self-interference metric. In some aspects, the twenty-fifth aspect may include selecting an FD beam set based at least in part on the first set of candidate FD beam pairs and the second set of candidate FD beam pairs.

In a twenty-sixth aspect, receiving the first indication of the one or more candidate FD beam pairs include receiving the first indication in a sidelink control message.

In a twenty-seventh aspect, the first indication specifies, for each beam included in a candidate FD beam pair of the one or more candidate FD beam pairs, a respective beam index.

In a twenty-eighth aspect, the respective beam index includes at least one of an SSB beam index, or a CSI-RS beam index.

In a twenty-ninth aspect, the first indication specifies, for each candidate FD beam pair of the one or more candidate FD beam pairs, a respective signal metric that indicates a performance quality of the FD beam pair.

In a thirtieth aspect, transmitting the second indication includes transmitting the second indication in a PSCCH.

In a thirty-first aspect, the second indication specifies that the FD beam set is associated with at least two sidelink channels.

In a thirty-second aspect, the FD beam set is a first FD beam set, the second indication specifies that the first FD beam set is associated with a first sidelink channel, and the second indication specifies a second FD beam set that is associated with a second sidelink channel.

In a thirty-third aspect, process 1100 includes switching from communicating with the first UE based at least in part on an HD sidelink transmission to communicating with the first UE based at least in part on the FD sidelink transmission, and communicating using the sidelink based at least in part on the FD sidelink transmission is based at least in part on switching.

In a thirty-fourth aspect, switching from communicating with the first UE based at least in part on the HD sidelink transmission to communicating with the first UE based at least in part on the FD sidelink transmission includes switching without performing channel sensing after receiving the second indication.

In a thirty-fifth aspect, switching from communicating with the first UE based at least in part on the HD sidelink transmission to communicating with the first UE based at least in part on the FD sidelink transmission includes switching to communicating with the first UE based at least in part on the FD sidelink transmission and a pre-configured FD synchronization configuration.

In a thirty-sixth aspect, switching from communicating with the first UE based at least in part on the HD sidelink transmission to communicating with the first UE based at least in part on the FD sidelink transmission includes switching after receiving the second indication and performing channel sensing.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
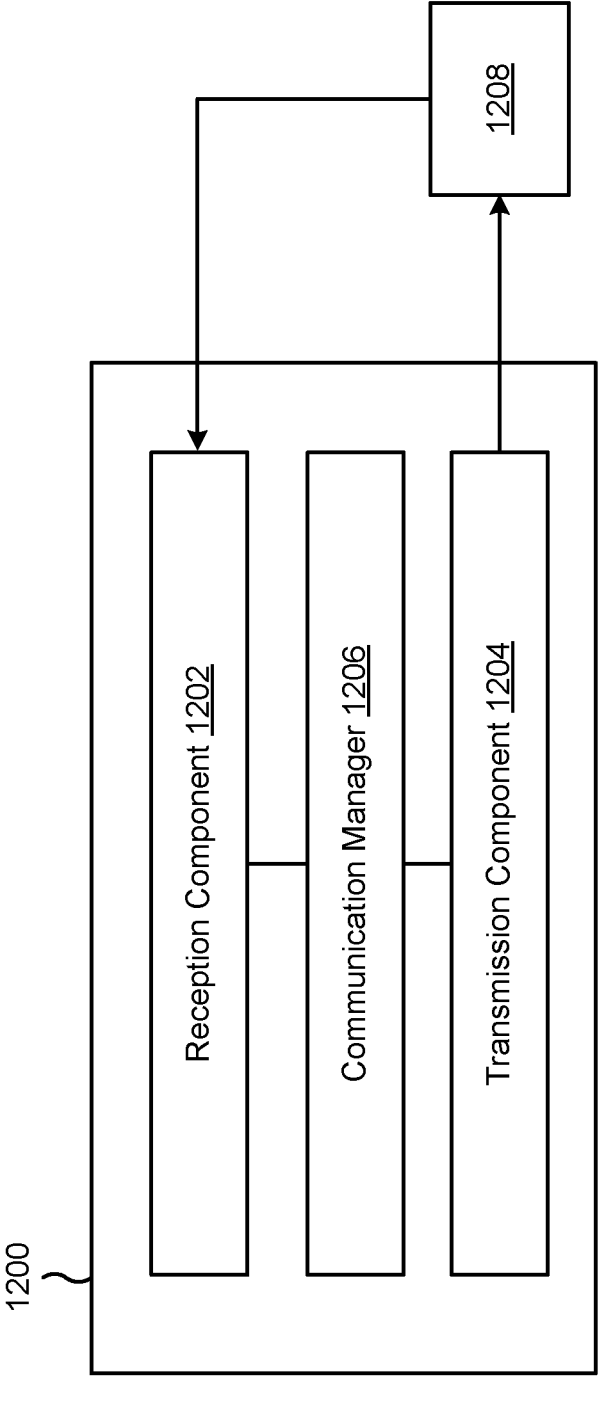
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-11. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, using a sidelink with a second UE, a first indication of one or more candidate FD beam pairs selected by the first UE for an FD sidelink transmission. The reception component 1202 may receive, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The reception component 1202 and/or the transmission component 1204 may communicate with the second UE using the sidelink based at least in part on the FD beam set and the FD sidelink transmission.

The transmission component 1204 may transmit, using the sidelink, FD sidelink capability information associated with the first UE.

The reception component 1202 may receive, using the sidelink and from the second UE, a request for the FD sidelink capability information, and transmitting the FD sidelink capability information is based at least in part on receiving the request.

The reception component 1202 may receive, using the sidelink, FD sidelink capability information associated with the second UE.

The communication manager 1206 may identify, using the FD sidelink capability information, a common FD sidelink capability that is supported by the second UE and the first UE.

The communication manager 1206 may communicate, with the second UE and prior to transmitting the one or more candidate FD beam pairs, using an HD sidelink transmission based at least in part on an HD link beam pair.

The reception component 1202 may receive, using the sidelink, reference signal configuration information.

The reception component 1202 may receive a reference signal based at least in part on the reference signal configuration information, and generating the signal metric is based at least in part on the reference signal.

The communication manager 1206 may generate one or more interference metrics based at least in part on one or more HD sidelink transmissions and a transmit-side beam sweeping procedure.

The communication manager 1206 may select the one or more candidate FD beam pairs based at least in part on the one or more interference metrics.

The communication manager 1206 may perform a receive-side beam sweeping procedure that iteratively changes a beam pairing of an HD transmit beam and a respective receive beam in a set of receive beams.

The communication manager 1206 may perform a transmit-side beam sweeping procedure that iteratively changes a beam pairing of a receive beam with a respective transmit beam included in a set of transmit beams.

The communication manager 1206 may reserve at least one sidelink air interface resource for a data transmission based at least in part on at least one of the transmit-side beam sweeping procedure or the receive-side beam sweeping procedure.

The transmission component 1204 may transmit a signal based at least in part on the at least one sidelink air interface resource.

The communication manager 1206 may generate a self-interference metric based at least in part on transmitting the signal.

The transmission component 1204 may transmit, using the sidelink, a request for a preferred beam report.

The transmission component 1204 may transmit, using the sidelink, one or more reference signals based at least in part on using one or more transmit beams.

The reception component 1202 may receive, using the sidelink, the preferred beam report.

The communication manager 1206 may generate a self-interference metric based at least in part on at least a portion of a sidelink receive channel bandwidth associated with an HD transmission.

The communication manager 1206 may select the one or more FD beam pairs based at least in part on the self-interference metric.

The communication manager 1206 may generate a self-interference metric based at least in part on at least a portion of a sidelink transmit channel bandwidth associated with an HD transmission.

The communication manager 1206 may select the one or more FD beam pairs based at least in part on the self-interference metric.

The communication manager 1206 may generate a self-interference metric based at least in part on using at least a portion of a frequency bandwidth that is outside of a sidelink receive channel bandwidth and a sidelink transmit channel bandwidth.

The communication manager 1206 may select the one or more FD beam pairs based at least in part on the self-interference metric.

The communication manager 1206 may calculate, for each candidate FD beam pair of the one or more candidate FD beam pairs, a respective quality metric based at least in part on at least one of a signal metric or an interference metric.

The communication manager 1206 may determine a rank order of the one or more candidate FD beam pairs based at least in part on the respective quality metric of each candidate FD beam pair.

The communication manager 1206 may omit, from the first indication, a respective signal metric associated with each candidate FD beam pair to indicate that the one or more candidate FD beam pairs have commensurate performance quality within a threshold value.

The communication manager 1206 may switch from communicating with the second UE based at least in part on an HD sidelink transmission to communicating with the second UE based at least in part on the FD sidelink transmission.

Alternatively, or additionally, the reception component 1202 may receive, using a sidelink with a first UE, a first indication of one or more candidate FD beam pairs selected by the first UE for an FD sidelink transmission. The transmission component 1204 may transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs. The reception component 1202 and/or the transmission component 1204 may communicate with the second UE using the sidelink based at least in part on the FD beam set and the FD sidelink transmission.

Alternatively, or additionally, the reception component 1202 may receive, using the sidelink, FD sidelink capability information associated with the first UE.

Alternatively, or additionally, the transmission component 1204 may transmit, using the sidelink, FD sidelink capability information associated with the second UE.

Alternatively, or additionally, the reception component 1202 may receive, using the sidelink, a request for the FD sidelink capability information that is associated with the second UE.

Alternatively, or additionally, the communication manager 1206 may 1206 may communicate, prior to receiving the one or more candidate FD beam pairs, with the first UE using an HD sidelink transmission and based at least in part on an HD sidelink beam pair.

Alternatively, or additionally, the communication manager 1206 may 1206 may calculate, for each candidate FD beam pair of the one or more candidate FD beam pairs, a respective quality metric.

Alternatively, or additionally, the communication manager 1206 may select the FD beam set at least in part on the respective quality metric of each candidate FD beam pair of the one or more candidate FD beam pairs.

Alternatively, or additionally, the reception component 1202 may receive, using the sidelink and prior to transmission of the first indication, a request for a preferred beam report.

Alternatively, or additionally, the reception component 1202 may receive one or more reference signals based at least in part on the one or more candidate FD beam pairs.

Alternatively, or additionally, the communication manager 1206 may generate one or more signal metrics based at least in part on the one or more candidate FD beam pairs.

Alternatively, or additionally, the communication manager 1206 may generate the preferred beam report based at least in part on the one or more signal metrics.

Alternatively, or additionally, the transmission component 1204 may transmit, using the sidelink, the preferred beam report.

Alternatively, or additionally, the communication manager 1206 may switch from communicating with the first UE based at least in part on an HD sidelink transmission to communicating with the first UE based at least in part on the FD sidelink transmission and communicating using the sidelink based at least in part on the FD sidelink transmission is based at least in part on switching.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: transmitting, using a sidelink with a second UE, a first indication of one or more candidate full-duplex (FD) beam pairs selected by the first UE for an FD sidelink transmission; receiving, using the sidelink, a second indication that specifies at least part of an FD beam set that includes at least a first FD beam pair associated with the first UE and a second FD beam pair associated with the second UE, the FD beam set being based at least in part on the one or more candidate FD beam pairs; and communicating with the second UE using the sidelink based at least in part on the FD beam set and the FD sidelink transmission.

Aspect 2: The method of Aspect 1, wherein the second indication specifies the first FD beam pair, and the first FD beam pair comprises: a first FD sidelink transmit beam associated with the first UE, and a first FD sidelink receive beam associated with the first UE.

Aspect 3: The method of Aspect 2, wherein the second indication specifies the second FD beam pair, and the second FD beam pair comprises: a second FD sidelink transmit beam associated with the second UE, and a second FD sidelink receive beam associated with the second UE.

Aspect 4: The method of any of Aspects 1-3, further comprising: transmitting, using the sidelink, FD sidelink capability information associated with the first UE.

Aspect 5: The method of Aspect 4, wherein transmitting the FD sidelink capability information comprises: transmitting the FD sidelink capability information in sidelink control information.

Aspect 6: The method of Aspect 4, wherein transmitting the FD sidelink capability information comprises: transmitting the FD sidelink capability information based at least in part on a sidelink discovery process.

Aspect 7: The method of Aspect 4, wherein transmitting the FD sidelink capability information comprises at least one of: broadcasting the FD sidelink capability information, transmitting the FD sidelink capability information in a multicast message, or transmitting the FD sidelink capability information in a unicast message.

Aspect 8: The method of Aspect 4, wherein the FD sidelink capability information indicates at least one of: at least one supported FD mode, at least one supported link type, a first maximum number of supported FD beams associated with the at least one supported link type, a second maximum number of directional ports, or a channel type.

Aspect 9: The method of Aspect 4, wherein transmitting the FD sidelink capability information comprises: transmitting the FD sidelink capability information during a radio resource control (RRC) setup procedure associated with the sidelink.

Aspect 10: The method of Aspect 4, wherein transmitting the FD sidelink capability information comprises: transmitting the FD sidelink capability information after establishing a radio resource control (RRC) connected state that is associated with the sidelink.

Aspect 11: The method of Aspect 4, wherein the FD sidelink capability information associated with the first UE is first FD sidelink capability information, and the method further comprises: transmitting, using the sidelink, a request for second FD sidelink capability information that is associated with the second UE.

Aspect 12: The method of Aspect 4, further comprising: receiving, using the sidelink and from the second UE, a request for the FD sidelink capability information, wherein transmitting the FD sidelink capability information is based at least in part on receiving the request.

Aspect 13: The method of any of Aspects 1-12, further comprising: receiving, using the sidelink, FD sidelink capability information associated with the second UE.

Aspect 14: The method of Aspect 13, further comprising: identifying, using the FD sidelink capability information, a common FD sidelink capability that is supported by the second UE and the first UE, wherein communicating using the sidelink based at least in part on the FD beam set and the FD sidelink transmission further comprises: communicating using the sidelink based at least in part on the common FD sidelink capability, wherein communicating using the sidelink based at least in part on the FD beam set and the FD sidelink transmission further comprises: communicating using the sidelink based at least in part on the common FD sidelink capability.

Aspect 15: The method of any of Aspects 1-14 further comprising: communicating, with the second UE and prior to transmitting the one or more candidate FD beam pairs, using an HD sidelink transmission based at least in part on an HD link beam pair.

Aspect 16: The method of Aspect 15, wherein communicating using the HD sidelink transmission comprises: receiving the HD sidelink transmission from the second UE, and wherein the method further comprises: generating a signal metric based at least in part on the HD sidelink transmission.

Aspect 17: The method of Aspect 16, wherein generating the signal metric comprises: generating the signal metric based at least in part on using at least a portion of the HD sidelink transmission that is within a configured sidelink receive channel bandwidth.

Aspect 18: The method of Aspect 16, further comprising: receiving, using the sidelink, reference signal configuration information; and receiving a reference signal based at least in part on the reference signal configuration information, wherein generating the signal metric is based at least in part on the reference signal.

Aspect 19: The method of Aspect 18, wherein the reference signal configuration information indicates that at least a portion of the reference signal is outside of a configured bandwidth, and wherein generating the signal metric is based at least in part on the at least a portion of the reference signal that is outside of the configured bandwidth.

Aspect 20: The method of any of Aspects 1-19, further comprising: generating one or more interference metrics based at least in part on one or more half-duplex (HD) sidelink transmissions and a transmit-side beam sweeping procedure; and selecting the one or more candidate FD beam pairs based at least in part on the one or more interference metrics.

Aspect 21: The method of Aspect 20, wherein the one or more interference metrics comprise at least one of: a self-interference metric, or an external interference metric.

Aspect 22: The method of Aspect 20, further comprising: performing a receive-side beam sweeping procedure that iteratively changes a beam pairing of an HD transmit beam and a respective receive beam in a set of receive beams, wherein generating the one or more interference metrics comprises: generating a respective interference metric of the one or more interference metrics based at least in part on the beam pairing of the HD transmit beam and the respective receive beam, wherein generating the one or more interference metrics comprises: generating a respective interference metric of the one or more interference metrics based at least in part on the beam pairing of the HD transmit beam and the respective receive beam.

Aspect 23: The method of Aspect 20, further comprising: performing a transmit-side beam sweeping procedure that iteratively changes a beam pairing of a receive beam with a respective transmit beam included in a set of transmit beams, wherein generating the one or more interference metrics comprises: generating a respective interference metric of the one or more interference metrics based at least in part on the beam pairing of the receive beam and the respective transmit beam, wherein generating the one or more interference metrics comprises: generating a respective interference metric of the one or more interference metrics based at least in part on the beam pairing of the receive beam and the respective transmit beam.

Aspect 24: The method of Aspect 23, wherein the set of transmit beams is a first set of transmit beans, wherein the receive beam is included in a second set of receive beams, and the method further comprises: performing a receive-side beam sweeping procedure that iteratively changes the receive beam included in the beam pairing to a different receive beam included in the second set of receive beams, wherein generating the one or more interference metrics comprises: generating the respective interference metric of the one or more interference metrics based at least in part on the beam pairing including the different receive beam.

Aspect 25: The method of Aspect 24, further comprising: reserving at least one sidelink air interface resource for a data transmission based at least in part on at least one of the transmit-side beam sweeping procedure or the receive-side beam sweeping procedure; transmitting a signal based at least in part on the at least one sidelink air interface resource; and generating a self-interference metric based at least in part on transmitting the signal.

Aspect 26: The method of any of Aspects 1-25, further comprising: transmitting, using the sidelink, a request for a preferred beam report; transmitting, using the sidelink, one or more reference signals based at least in part on using one or more transmit beams; and receiving, using the sidelink, the preferred beam report.

Aspect 27: The method of Aspect 26, wherein the one or more reference signals comprise one or more sidelink synchronization signal blocks (SL-SSBs).

Aspect 28: The method of Aspect 26, wherein the preferred beam report specifies at least one of: a first preferred transmit beam that is based at least in part on the one or more transmit beams, or a second preferred transmit beam that is associated with the second UE.

Aspect 29: The method of any of Aspects 1-28, wherein the one or more candidate FD beam pairs comprises a first set of candidate FD beam pairs that are selected by the first UE, and the method further comprises: receiving, using the sidelink and prior to transmitting the first indication, a self-interference measurement report that indicates a second set of candidate FD beam pairs that are selected by the second UE, wherein the first set of candidate FD beam pairs is based at least in part on the second set of candidate FD beam pairs.

Aspect 30: The method of any of Aspects 1-29, wherein transmitting the first indication of the one or more candidate FD beam pairs comprises: transmitting the first indication using a transmission order that is based at least in part on a UE identifier (ID) associated with the first UE.

Aspect 31: The method of any of Aspects 1-30, further comprising: generating a self-interference metric based at least in part on at least a portion of a sidelink receive channel bandwidth associated with a half-duplex (HD) transmission; and selecting the one or more FD beam pairs based at least in part on the self-interference metric.

Aspect 32: The method of any of Aspects 1-31, further comprising: generating a self-interference metric based at least in part on at least a portion of a sidelink transmit channel bandwidth associated with a half-duplex (HD) transmission; and selecting the one or more FD beam pairs based at least in part on the self-interference metric.

Aspect 33: The method of any of Aspects 1-32, further comprising: generating a self-interference metric based at least in part on using at least a portion of a frequency bandwidth that is outside of a sidelink receive channel bandwidth and a sidelink transmit channel bandwidth; and selecting the one or more FD beam pairs based at least in part on the self-interference metric.

Aspect 34: The method of any of Aspects 1-33, further comprising: calculating, for each candidate FD beam pair of the one or more candidate FD beam pairs, a respective quality metric based at least in part on at least one of: a signal metric or an interference metric; and determining a rank order of the one or more candidate FD beam pairs based at least in part on the respective quality metric of each candidate FD beam pair, wherein the first indication of the one or more FD beam pairs specifies the rank order.

Aspect 35: The method of Aspect 34, wherein the one or more candidate FD beam pairs are a subset of candidate FD beam pairs that are included in a set of candidate FD beam pairs.

Aspect 36: The method of Aspect 35, wherein the respective quality metric comprises a signal-to-interference-noise ratio (SINR) metric.

Aspect 37: The method of any of Aspects 1-36, wherein transmitting the first indication of the one or more candidate FD beam pairs comprises: transmitting the first indication in a sidelink control message.

Aspect 38: The method of any of Aspects 1-37, wherein the first indication specifies, for each beam included in a candidate FD beam pair of the one or more candidate FD beam pairs, a respective beam index.

Aspect 39: The method of Aspect 38, wherein the respective beam index comprises at least one of: a synchronization signal block (SSB) beam index, or a channel state information reference signal (CSI-RS) beam index.

Aspect 40: The method of any of Aspects 1-39, wherein the first indication specifies, for each candidate FD beam pair of the one or more candidate FD beam pairs, a respective signal metric that indicates a performance quality of the FD beam pair.

Aspect 41: The method of Aspect 40, wherein the first indication specifies, for the each candidate FD beam pair, a joint metric that is based at least in part on the respective signal metric and a respective interference metric.

Aspect 42: The method of any of Aspects 1-41, further comprising: omitting, from the first indication, a respective signal metric associated with each candidate FD beam pair to indicate that the one or more candidate FD beam pairs have commensurate performance quality within a threshold value.

Aspect 43: The method of any of Aspects 1-42, wherein receiving the second indication comprises: receiving the second indication in a physical sidelink control channel (PSCCH).

Aspect 44: The method of any of Aspects 1-43, wherein the second indication specifies that the FD beam set is associated with at least two sidelink channels.

Aspect 45: The method of any of Aspects 1-44, wherein the FD beam set is a first FD beam set, wherein the second indication specifies that the first FD beam set is associated with a first sidelink channel, and wherein the second indication specifies a second FD beam set that is associated with a second sidelink channel.

Aspect 46: The method of any of Aspects 1-45, further comprising: switching from communicating with the second UE based at least in part on a half-duplex (HD) sidelink transmission to communicating with the second UE based at least in part on the FD sidelink transmission.

Aspect 47: The method of Aspect 46, wherein switching from communicating with the second UE based at least in part on the HD sidelink transmission to communicating with the second UE based at least in part on the FD sidelink transmission comprises: switching without performing channel sensing after receiving the second indication.

Aspect 48: The method of Aspect 47, wherein switching from communicating with the second UE based at least in part on the HD sidelink transmission to communicating with the second UE based at least in part on the FD sidelink transmission comprises: switching to communicating with the second UE based at least in part on the FD sidelink transmission and a pre-configured FD synchronization configuration.

Aspect 49: The method of Aspect 46, wherein switching from communicating with the second UE based at least in part on the HD sidelink transmission to communicating with the second UE based at least in part on the FD sidelink transmission comprises: switching after receiving the second indication and performing channel sensing.

Aspect 50: A method of wireless communication performed by a second user equipment (UE), comprising: receiving, using a sidelink with a first UE, a first indication of one or more candidate full-duplex (FD) beam pairs selected by the first UE for an FD sidelink transmission; transmitting, using the sidelink, a second indication that specifies at least part of an FD beam set that includes a first FD beam pair associated with the first UE and a second FD beam pair associated with the second UE, the FD beam set being based at least in part on the one or more candidate FD beam pairs; and communicating with the first UE using the sidelink based at least in part on the FD beam set and the FD sidelink transmission.

Aspect 51: The method of Aspect 50, wherein the second indication specifies the first FD beam pair, wherein the first FD beam pair comprises: a first FD sidelink transmit beam associated with the first UE, and a first FD sidelink receive beam associated with the first UE.

Aspect 52: The method of Aspect 51, wherein the second indication specifies the second FD beam pair, and wherein the second FD beam pair comprises: a second FD sidelink transmit beam associated with the second UE, and a second FD sidelink receive beam associated with the second UE.

Aspect 53: The method of any of Aspects 50-52, further comprising: receiving, using the sidelink, FD sidelink capability information associated with the first UE.

Aspect 54: The method of any of Aspects 50-53, comprising: transmitting, using the sidelink, FD sidelink capability information associated with the second UE.

Aspect 55: The method of Aspect 54, further comprising: receiving, using the sidelink, a request for the FD sidelink capability information that is associated with the second UE; wherein transmitting the FD sidelink capability information is based at least in part on receiving the request, wherein transmitting the FD sidelink capability information is based at least in part on receiving the request.

Aspect 56: The method of any of Aspects 50-55, further comprising: communicating, prior to receiving the one or more candidate FD beam pairs, with the first UE using a half-duplex (HD) sidelink transmission and based at least in part on an HD sidelink beam pair.

Aspect 57: The method of Aspect 56, wherein communicating with the first UE using the HD sidelink transmission comprises: receiving the HD sidelink transmission from the first UE, and wherein the method further comprises: generating a signal metric based at least in part on the HD sidelink transmission.

Aspect 58: The method of any of Aspects 50-57, wherein the one or more candidate FD beam pairs is a first set of candidate FD beam pairs, and the method further comprises: generating one or more interference metrics based at least in part on one or more half-duplex (HD) sidelink transmissions; and selecting a second set of candidate FD beam pairs based at least in part on the one or more interference metrics.

Aspect 59: The method of Aspect 58, wherein the one or more interference metrics comprise at least one of: a self-interference metric, or an external interference metric.

Aspect 60: The method of Aspect 58, wherein the second set of candidate FD beam pairs is based at least in part on the first set of candidate FD beam pairs.

Aspect 61: The method of Aspect 60, wherein the second set of candidate FD beam pairs is a subset of the first set of candidate FD beam pairs.

Aspect 62: The method of any of Aspects 58-61, further comprising: selecting an FD beam set based at least in part on the first set of candidate FD beam pairs and the second set of candidate FD beam pairs.

Aspect 63: The method of Aspect 58, wherein selecting the second set of candidate FD beam pairs comprises: selecting the second set of candidate FD beam pairs independent of the first set of candidate FD beam pairs.

Aspect 64: The method of any of Aspects 50-63, further comprising: calculating, for each candidate FD beam pair of the one or more candidate FD beam pairs, a respective quality metric; and selecting the FD beam set at least in part on the respective quality metric of each candidate FD beam pair of the one or more candidate FD beam pairs.

Aspect 65: The method of Aspect 64, wherein the respective quality metric comprises a signal-to-interference-noise ratio (SINR) metric.

Aspect 66: The method of Aspect 64, wherein the FD beam set is one of multiple FD beam sets, wherein selecting the FD beam set comprises selecting the multiple FD beam sets, and wherein the second indication specifies the multiple FD beam sets.

Aspect 67: The method of Aspect 64, wherein selecting the FD beam set comprises: selecting the FD beam set based at least in part on mitigating self-interference at the first UE and the second UE.

Aspect 68: The method of Aspect 67, wherein mitigating the self-interference at the first UE and the second UE comprises: selecting an FD beam set based at least in part on jointly optimizing a first signal-and-interference metric associated with the first UE and a second signal-and-interference metric at the second UE.

Aspect 69: The method of Aspect 64, wherein selecting the FD beam set is based at least in part on a quality threshold.

Aspect 70: The method of any of Aspects 50-69, further comprising: receiving, using the sidelink and prior to transmission of the first indication, a request for a preferred beam report; generating one or more signal metrics based at least in part on the one or more candidate FD beam pairs associated with the first UE; generating the preferred beam report based at least in part on the one or more signal metrics; and transmitting, using the sidelink, the preferred beam report.

Aspect 71: The method of Aspect 70, wherein the one or more reference signals comprises at least one of: one or more sidelink synchronization signal blocks (SL-SSBs), one or more channel state information reference signals (CSI-RSs).

Aspect 72: The method of any of Aspects 50-71, wherein the one or more candidate FD beam pairs comprise a first set of candidate FD beam pairs that are selected by the first UE, and the method further comprises: transmitting, using the sidelink and prior to transmitting the first indication, a self-interference measurement report that indicates a second set of candidate FD beam pairs that are selected by the second UE, wherein the first set of candidate FD beam pairs is based at least in part on the second set of candidate FD beam pairs.

Aspect 73: The method of any of Aspects 50-72, wherein receiving the first indication of the one or more candidate FD beam pairs comprises: receiving the first indication using a transmission order that is based at least in part on a UE identifier (ID) associated with the second UE.

Aspect 74: The method of any of Aspects 50-73, wherein the one or more candidate FD beam pairs comprise a first set of candidate FD beam pairs that are selected by the first UE, and the method further comprises: generating a self-interference metric based at least in part on using at least a portion of a sidelink receive channel bandwidth associated with a half-duplex (HD) transmission; and selecting a second set of one or more candidate FD beam pairs based at least in part on the self-interference metric.

Aspect 75: The method of any of Aspects 50-74, wherein the one or more candidate FD beam pairs comprise a first set of candidate FD beam pairs that are selected by the first UE, and the method further comprises: generating a self-interference metric based at least in part on at least a portion of a sidelink transmit channel bandwidth associated with a half-duplex (HD) transmission; and selecting a second set of one or more candidate FD beam pairs based at least in part on the self-interference metric.

Aspect 76: The method of any of Aspects 50-75, wherein the one or more candidate FD beam pairs comprise a first set of candidate FD beam pairs that are selected by the first UE, and the method further comprises: generating a self-interference metric based at least in part on using at least a portion of a frequency bandwidth that is outside of a sidelink receive channel bandwidth and a sidelink transmit channel bandwidth; and selecting a second set of one or more candidate FD beam pairs based at least in part on the self-interference metric.

Aspect 77: The method of any of Aspects 50-76, wherein receiving the first indication of the one or more candidate FD beam pairs comprise: receiving the first indication in a sidelink control message.

Aspect 78: The method of any of Aspects 50-77, wherein the first indication specifies, for each beam included in a candidate FD beam pair of the one or more candidate FD beam pairs, a respective beam index.

Aspect 79: The method of Aspect 78, wherein the respective beam index comprises at least one of: a synchronization signal block (SSB) beam index, or a channel state information reference signal (CSI-RS) beam index.

Aspect 80: The method of any of Aspects 50-79, wherein the first indication specifies, for each candidate FD beam pair of the one or more candidate FD beam pairs, a respective signal metric that indicates a performance quality of the FD beam pair.

Aspect 81: The method of any of Aspects 50-80, wherein transmitting the second indication comprises: transmitting the second indication in a physical sidelink control channel (PSCCH).

Aspect 82: The method of any of Aspects 50-81, wherein the second indication specifies that the FD beam set is associated with at least two sidelink channels.

Aspect 83: The method of any of Aspects 50-82, wherein the FD beam set is a first FD beam set, wherein the second indication specifies that the first FD beam set is associated with a first sidelink channel, and wherein the second indication specifies a second FD beam set that is associated with a second sidelink channel.

Aspect 84: The method of any of Aspects 50-83, further comprising: switching from communicating with the first UE based at least in part on a half-duplex (HD) sidelink transmission to communicating with the first UE based at least in part on the FD sidelink transmission, wherein communicating using the sidelink based at least in part on the FD sidelink transmission is based at least in part on switching.

Aspect 85: The method of Aspect 84, wherein switching from communicating with the first UE based at least in part on the HD sidelink transmission to communicating with the first UE based at least in part on the FD sidelink transmission comprises: switching without performing channel sensing after receiving the second indication.

Aspect 86: The method of Aspect 85, wherein switching from communicating with the first UE based at least in part on the HD sidelink transmission to communicating with the first UE based at least in part on the FD sidelink transmission comprises: switching to communicating with the first UE based at least in part on the FD sidelink transmission and a pre-configured FD synchronization configuration.

Aspect 87: The method of Aspect 86, wherein switching from communicating with the first UE based at least in part on the HD sidelink transmission to communicating with the first UE based at least in part on the FD sidelink transmission comprises: switching after receiving the second indication and performing channel sensing.

Aspect 88: An apparatus for wireless communication at a device, comprising a processor; memory coupled with the processor; and instructions stored in the memory and executable by the processor to cause the apparatus to perform the method of one or more of Aspects 1-49.

Aspect 89: An apparatus for wireless communication at a device, comprising a processor; memory coupled with the processor; and instructions stored in the memory and executable by the processor to cause the apparatus to perform the method of one or more of Aspects 50-87.

Aspect 90: A device for wireless communication, comprising a memory and one or more processors coupled to the memory, the one or more processors configured to perform the method of one or more of Aspects 1-49.

Aspect 91: A device for wireless communication, comprising a memory and one or more processors coupled to the memory, the one or more processors configured to perform the method of one or more of Aspects 50-87.

Aspect 92: An apparatus for wireless communication, comprising at least one means for performing the method of one or more of Aspects 1-49.

Aspect 93: An apparatus for wireless communication, comprising at least one means for performing the method of one or more of Aspects 50-87.

Aspect 94: A non-transitory computer-readable medium storing code for wireless communication, the code comprising instructions executable by a processor to perform the method of one or more of Aspects 1-49.

Aspect 95: A non-transitory computer-readable medium storing code for wireless communication, the code comprising instructions executable by a processor to perform the method of one or more of Aspects 50-87.

Aspect 96: A non-transitory computer-readable medium storing a set of instructions for wireless communication, the set of instructions comprising one or more instructions that, when executed by one or more processors of a device, cause the device to perform the method of one or more of Aspects 1-49.

Aspect 97: A non-transitory computer-readable medium storing a set of instructions for wireless communication, the set of instructions comprising one or more instructions that, when executed by one or more processors of a device, cause the device to perform the method of one or more of Aspects 50-87.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, based at least in part on information stored in the one or more memories, configured to:
      identify a common full-duplex (FD) sidelink capability that is supported by the first UE and a second UE;
      transmit, using a sidelink with the second UE, a first indication of one or more candidate FD beam pairs selected by the first UE for an FD sidelink transmission;
      receive, using the sidelink, a second indication that specifies at least part of an FD beam set that includes at least a first FD beam pair associated with the first UE and a second FD beam pair associated with the second UE, the FD beam set being based at least in part on the one or more candidate FD beam pairs; and
      communicate with the second UE using the sidelink based at least in part on the common FD sidelink capability, the FD beam set, and the FD sidelink transmission.

2. The apparatus of claim 1, wherein the one or more processors, based at least in part on the information stored in the one or more memories, are further configured to:

transmit, using the sidelink, FD sidelink capability information associated with the first UE.

3. The apparatus of claim 1, wherein the one or more processors, based at least in part on the information stored in the one or more memories, are further configured to:
   communicate, with the second UE and prior to transmission of one or more candidate FD beam pairs, a half-duplex (HD) sidelink transmission based at least in part on an HD link beam pair.

4. The apparatus of claim 1, wherein the one or more processors, based at least in part on the information stored in the one or more memories, are further configured to:
   generate one or more interference metrics based at least in part on one or more half-duplex (HD) sidelink transmissions and a transmit-side beam sweeping procedure; and
   select the one or more candidate FD beam pairs based at least in part on the one or more interference metrics.

5. The apparatus of claim 4, wherein the one or more processors, based at least in part on the information stored in the one or more memories, are further configured to:
   perform a receive-side beam sweeping procedure that iteratively changes a beam pairing of an HD transmit beam and a respective receive beam in a set of receive beams,
   wherein the one or more processors, to generate the one or more interference metrics and based at least in part on the information stored in the one or more memories, are configured to:
      generate a respective interference metric of the one or more interference metrics based at least in part on the beam pairing of the HD transmit beam and the respective receive beam.

6. The apparatus of claim 1, wherein the one or more candidate FD beam pairs are a first set of candidate FD beam pairs that are selected by the first UE, and
   wherein the one or more processors, based at least in part on the information stored in the one or more memories, are further configured to:
      receive, using the sidelink and prior to transmitting the first indication, a self-interference measurement report that indicates a second set of candidate FD beam pairs that are selected by the second UE,
      wherein the first set of candidate FD beam pairs is based at least in part on the second set of candidate FD beam pairs.

7. The apparatus of claim 1, wherein the one or more processors, based at least in part on the information stored in the one or more memories, are further configured to:
   generate a self-interference metric based at least in part on at least a portion of a sidelink receive channel bandwidth associated with a half-duplex (HD) transmission; and
   select the one or more FD beam pairs based at least in part on the self-interference metric.

8. The apparatus of claim 1, wherein the one or more processors, based at least in part on the information stored in the one or more memories, are further configured to:
   generate a self-interference metric based at least in part on using at least a portion of a frequency bandwidth that is outside of a sidelink receive channel bandwidth and a sidelink transmit channel bandwidth; and
   select the one or more FD beam pairs based at least in part on the self-interference metric.

9. The apparatus of claim 1, wherein the one or more processors, based at least in part on the information stored in the one or more memories, are further configured to:

calculate, for each candidate FD beam pair of the one or more candidate FD beam pairs, a respective quality metric based at least in part on at least one of:
a signal metric or an interference metric; and
determine a rank order of the one or more candidate FD beam pairs based at least in part on the respective quality metric of each candidate FD beam pair,
wherein the first indication of the one or more FD beam pairs specifies the rank order.

10. The apparatus of claim 1, wherein the one or more processors, based at least in part on the information stored in the one or more memories, are further configured to:
switch from communicating with the second UE based at least in part on a half-duplex (HD) sidelink transmission to communicating with the second UE based at least in part on the FD sidelink transmission.

11. An apparatus for wireless communication at a second user equipment (UE), comprising:
one or more memories; and
one or more processors, based at least in part on information stored in the one or more memories, configured to:
identify a common full-duplex (FD) sidelink capability that is supported by the second UE and a first UE;
receive, using a sidelink with the first UE, a first indication of one or more candidate FD beam pairs selected by the first UE for an FD sidelink transmission;
transmit, using the sidelink, a second indication that specifies at least part of an FD beam set that includes a first FD beam pair associated with the first UE and a second FD beam pair associated with the second UE, the FD beam set being based at least in part on the one or more candidate FD beam pairs; and
communicate with the first UE using the sidelink based at least in part on the common FD sidelink capability, the FD beam set, and the FD sidelink transmission.

12. The apparatus of claim 11, wherein the one or more candidate FD beam pairs is a first set of candidate FD beam pairs, and wherein the one or more processors, based at least in part on the information stored in the one or more memories, are further configured to:
generate one or more interference metrics based at least in part on one or more half-duplex (HD) sidelink transmissions with one or more HD transmit beams; and
select a second set of candidate FD beam pairs based at least in part on the one or more interference metrics.

13. The apparatus of claim 12, further comprising: selecting the FD beam set based at least in part on the first set of candidate FD beam pairs and the second set of candidate FD beam pairs.

14. The apparatus of claim 11, wherein the one or more processors, based at least in part on the information stored in the one or more memories, are further configured to:
calculate, for each candidate FD beam pair of the one or more candidate FD beam pairs, a respective quality metric; and
select the FD beam set at least in part on the respective quality metric of each candidate FD beam pair of the one or more candidate FD beam pairs.

15. The apparatus of claim 14 wherein the one or more processors, to select the FD beam set and based at least in part on the information stored in the one or more memories, are configured to: select the FD beam set based at least in part on mitigating self-interference at the first UE and the second UE.

16. The apparatus of claim 15, wherein the one or more processors, to mitigate the self-interference at the first UE and the second UE and based at least in part on the information stored in the one or more memories, are configured to:
select the FD beam set based at least in part on jointly optimizing a first signal-and-interference metric associated with the first UE and a second signal-and-interference metric at the second UE.

17. The apparatus of claim 11, wherein the one or more processors, based at least in part on the information stored in the one or more memories, are further configured to:
receive, using the sidelink and prior to transmission of the first indication, a request for a preferred beam report;
generate one or more signal metrics based at least in part on the one or more transmit beams associated with the first UE;
generate the preferred beam report based at least in part on the one or more signal metrics; and
transmit, using the sidelink, the preferred beam report.

18. The apparatus of claim 11, wherein the one or more candidate FD beam pairs are a first set of candidate FD beam pairs that are selected by the first UE, and
wherein the one or more processors, based at least in part on the information stored in the one or more memories, are further configured:
transmit, using the sidelink and prior to transmission of the first indication, a self-interference measurement report that indicates a second set of candidate FD beam pairs that are selected by the second UE,
wherein the first set of candidate FD beam pairs is based at least in part on the second set of candidate FD beam pairs.

19. The apparatus of claim 11, wherein the one or more processors, to receive the first indication of the one or more candidate FD beam pairs and based at least in part on the information stored in the one or more memories, are configured to:
receive the first indication using a transmission order that is based at least in part on a UE identifier (ID) associated with the second UE.

20. The apparatus of claim 11, wherein the one or more candidate FD beam pairs are a first set of candidate FD beam pairs that are selected by the first UE, and
wherein the one or more processors, based at least in part on the information stored in the one or more memories, are further configured to:
generate a self-interference metric based at least in part on using at least a portion of a sidelink receive channel bandwidth associated with a half-duplex (HD) transmission; and
select a second set of one or more candidate FD beam pairs based at least in part on the self-interference metric.

21. The apparatus of claim 11, wherein the one or more candidate FD beam pairs are a first set of candidate FD beam pairs that are selected by the first UE, and
wherein the one or more processors, based at least in part on the information stored in the one or more memories, are further configured to:
generate a self-interference metric based at least in part on at least a portion of a sidelink transmit channel bandwidth associated with a half-duplex (HD) transmission; and
select a second set of one or more candidate FD beam pairs based at least in part on the self-interference metric.

22. The apparatus of claim 11, wherein the one or more candidate FD beam pairs are a first set of candidate FD beam pairs that are selected by the first UE, and wherein the one or more processors, based at least in part on the information stored in the one or more memories, are further configured to:

generate a self-interference metric based at least in part on using at least a portion of a frequency bandwidth that is outside of a sidelink receive channel bandwidth and a sidelink transmit channel bandwidth; and select a second set of one or more candidate FD beam pairs based at least in part on the self-interference metric.

23. The apparatus of claim 11, wherein the first indication specifies, for each beam included in a candidate FD beam pair of the one or more candidate FD beam pairs, a respective beam index.

24. The apparatus of claim 11, wherein the first indication specifies, for each candidate FD beam pair of the one or more candidate FD beam pairs, a respective signal metric that indicates a performance quality of the FD beam pair.

25. The apparatus of claim 11, wherein the one or more processors, based at least in part on the information stored in the one or more memories, are further configured to:

switch from communicating with the first UE based at least in part on a half-duplex (HD) sidelink transmission to communicating with the first UE based at least in part on the FD sidelink transmission, wherein communicating using the sidelink based at least in part on the FD sidelink transmission is based at least in part on switching.

26. A method of wireless communication performed by a first user equipment (UE), comprising:

identifying a common full-duplex (FD) sidelink capability that is supported by the first UE and a second UE;

transmitting, using a sidelink with the second UE, a first indication of one or more candidate FD beam pairs selected by the first UE for an FD sidelink transmission;

receiving, using the sidelink, a second indication that specifies at least part of an FD beam set that includes a first FD beam pair associated with the first UE and a second FD beam pair associated with the second UE, the FD beam set being based at least in part on the one or more candidate FD beam pairs; and communicating with the second UE using the sidelink based at least in part on the common FD sidelink capability, the FD beam set and the FD sidelink transmission.

27. The method of claim 26, further comprising: generating a self-interference metric based at least in part on at least a portion of a sidelink receive channel bandwidth associated with a half-duplex (HD) transmission; and selecting the one or more FD beam pairs based at least in part on the self-interference metric.

28. A method of wireless communication performed by a second user equipment (UE), comprising:

identifying a common full-duplex (FD) sidelink capability that is supported by the second UE and a first UE;

receiving, using a sidelink with the first UE, a first indication of one or more candidate FD beam pairs selected by the first UE for an FD sidelink transmission;

transmitting, using the sidelink, a second indication that specifies at least part of an FD beam set that includes a first FD beam pair associated with the first UE and a second FD beam pair associated with the second UE, the FD beam set being based at least in part on the one or more candidate FD beam pairs; and communicating with the first UE using the sidelink based at least in part on the common FD sidelink capability, the FD beam set, and the FD sidelink transmission.

29. The method of claim 26, comprising:

generating a self-interference metric based at least in part on at least a portion of a sidelink receive channel bandwidth associated with a half-duplex (HD) transmission; and selecting the one or more FD beam pairs based at least in part on the self-interference metric.

30. The method of claim 26, comprising:

generating a self-interference metric based at least in part on using at least a portion of a frequency bandwidth that is outside of a sidelink receive channel bandwidth and a sidelink transmit channel bandwidth; and selecting the one or more FD beam pairs based at least in part on the self-interference metric.

* * * * *